US007386076B2

(12) United States Patent
Onggosanusi et al.

(10) Patent No.: US 7,386,076 B2
(45) Date of Patent: Jun. 10, 2008

(54) SPACE TIME ENCODED WIRELESS COMMUNICATION SYSTEM WITH MULTIPATH RESOLUTION RECEIVERS

(75) Inventors: Eko N. Onggosanusi, Dallas, TX (US); Anand G Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 936 days.

(21) Appl. No.: 10/107,275

(22) Filed: Mar. 26, 2002

(65) Prior Publication Data
US 2003/0016640 A1 Jan. 23, 2003

Related U.S. Application Data

(60) Provisional application No. 60/279,942, filed on Mar. 29, 2001.

(51) Int. Cl.
H04B 7/10 (2006.01)
H04L 1/02 (2006.01)
(52) U.S. Cl. .................. 375/347; 375/267; 375/299; 375/349; 375/350
(58) Field of Classification Search ............ 375/267, 375/299, 348, 347, 349, 350, 331, 332, 344
See application file for complete search history.

(56) References Cited

U.S. PATENT DOCUMENTS 6,144,711 A 11/2000 Raleigh et al.

(Continued)

FOREIGN PATENT DOCUMENTS

EP  1 059 784 A1  10/2001

OTHER PUBLICATIONS

"Schur Algorithms For Joint-Detection In TD-CDMA Based Mobile Radio Systems", M. Vollmer, et al., Annales Des Telecommunications- Annals of Telecommunications, Presses Polytechniques Et Universitaires Romandes, Lausanne, Ch, vol. 54, No. 7/8, Jul. 1999, pp. 365-378, XP000854220, ISSN: 0003-4347.

(Continued)

Primary Examiner—Phuong Phu
(74) Attorney, Agent, or Firm—Ronald O. Neerings; Wade J. Brady, III; Frederick J. Telecky, Jr.

(57) ABSTRACT

A wireless receiver ($30_1$) for receiving multiple space time encoded signals from a plurality of transmit antenna sets ($TAT_1$ through $TAT_2$, and $TAT_3$ through $TAT_4$), wherein the multiple space time encoded signals comprise a set of symbols and wherein each transmit antenna set is coupled to a corresponding encoder ($22_1$, $22_2$) at a single transmitter ($12_1$). The receiver comprises a plurality of receive antennas ($RAT_1$ through $RAT_Q$) and collection circuitry (32), coupled to the plurality of receive antennas, for collecting a plurality of signal samples for a plurality of successive time instances and from each of the plurality of receive antennas. The collected samples comprise samples of multipaths of the space time encoded signals. The receiver also comprises circuitry (34, 36), coupled to the plurality of receive antennas, for determining a linear time invariant multiple-input multiple-output matrix in response to pilot values in the received multiple space time encoded signals. Finally, the receiver comprise circuitry (40, $42_1$, $44_1$) for estimating at least selected ones of the symbols in response to the signal samples and the linear time invariant multiple-input multiple-output matrix.

17 Claims, 8 Drawing Sheets

U.S. PATENT DOCUMENTS 6,351,499 B1 * 2/2002 Paulraj et al. ............... 375/267
6,735,248 B2 * 5/2004 Gu et al. .................... 375/232
2001/0033614 A1 10/2001 Hudson

OTHER PUBLICATIONS

Ayman F. Naguib, Nambi Seshadri, A.R. Calderbank, Space Time Coding and Signal Processing for High Data Rate Communications, IEEE Signal Processing Magazine, May 2000, pp. 77-92.

Howard Huang, Harish Viswanathan, Multiple Antennas and Multiuser Detection in High Data Rate CDMA Systems, 0-7803-5718-3/00, IEEE, May 2000.

Ayman F. Naguib, Nambi Seshadri, A.R. Calderbank, Application of Space-Time Black Codes and Interface Suppression For High Capacity And High Data Rate Wireless Systems, 0-7803-5148-7/98, IEEE, 1998.

* cited by examiner

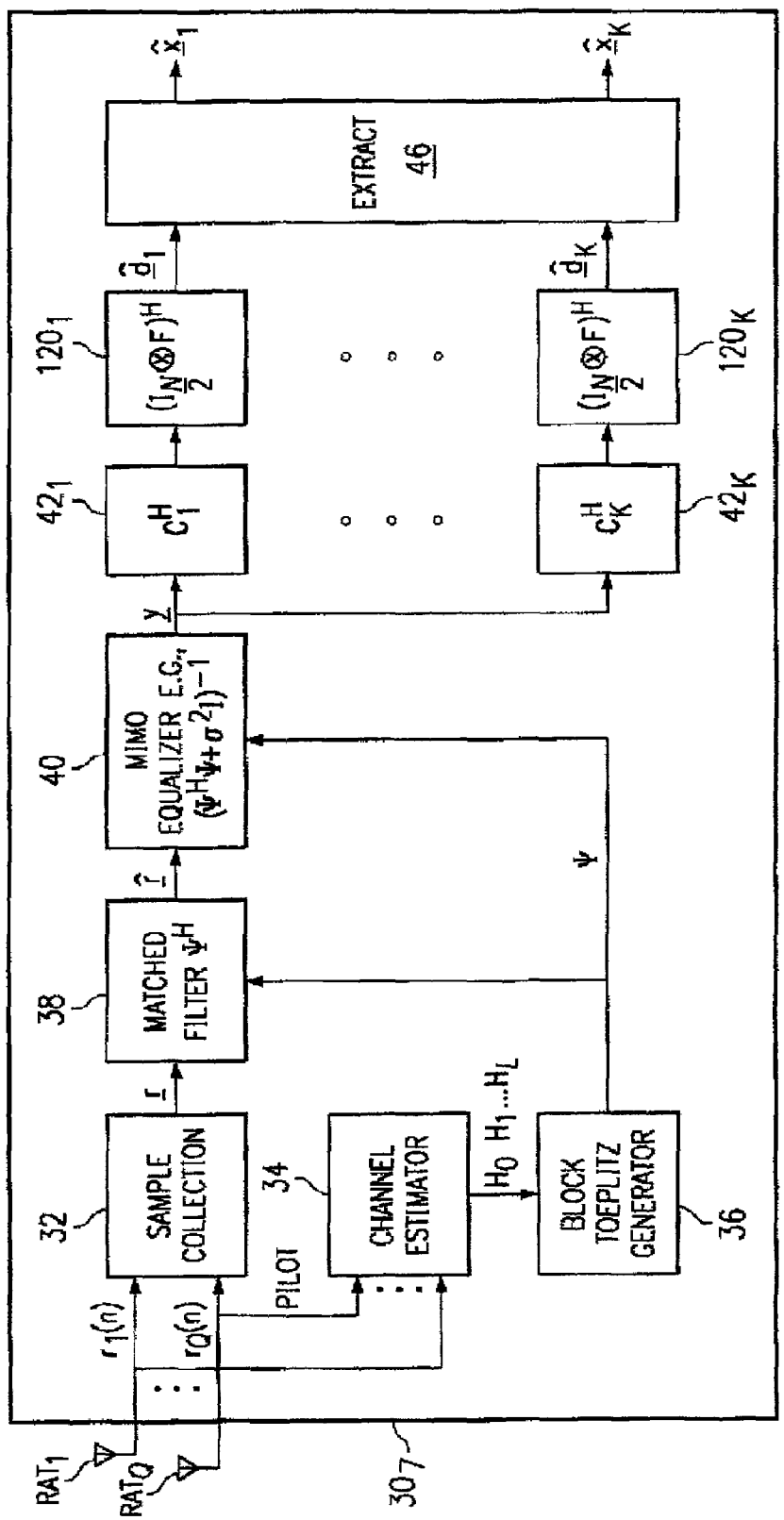

SPACE TIME ENCODED WIRELESS COMMUNICATION SYSTEM WITH MULTIPATH RESOLUTION RECEIVERS

CROSS-REFERENCES TO RELATED APPLICATIONS

This application claims the benefit, under 35 U.S.C. §119(e)(1), of U.S. Provisional Application No. 60/279,942, filed Mar. 29, 2001, and incorporated herein by this reference.

STATEMENT REGARDING FEDERALLY SPONSORED RESEARCH OR DEVELOPMENT

Not Applicable

BACKGROUND OF THE INVENTION

The present embodiments relate to wireless communications systems and, more particularly, to space time encoded wireless communication systems with multipath resolution receivers.

Wireless communications are prevalent in business, personal, and other applications, and as a result the technology for such communications continues to advance in various areas. One such advancement includes the use of spread spectrum communications, including that of code division multiple access ("CDMA") and wideband code division multiple access ("WCDMA") cellular communications. In such communications, a user station (e.g., a hand held cellular phone) communicates with a base station, where typically the base station corresponds to a "cell." CDMA communications are by way of transmitting symbols from a transmitter to a receiver, and the symbols are modulated using a spreading code which consists of a series of binary pulses. The code runs at a higher rate than the symbol rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. WCDMA includes alternative methods of data transfer, one being frequency division duplex ("FDD") and another being time division duplex ("TDD"), where the uplink and downlink channels are asymmetric for FDD and symmetric for TDD. Another wireless standard involves time division multiple access ("TDMA") apparatus, which also communicate symbols and are used by way of example in cellular systems. TDMA communications are transmitted as a group of packets in a time period, where the time period is divided into slots (i.e., packets) so that multiple receivers may each access meaningful information during a different part of that time period. In other words, in a group of TDMA receivers, each receiver is designated a slot in the time period, and that slot repeats for each group of successive packets transmitted to the receiver. Accordingly, each receiver is able to identify the information intended for it by synchronizing to the group of packets and then deciphering the time slot corresponding to the given receiver. Given the preceding, CDMA transmissions are receiver-distinguished in response to codes, while TDMA transmissions are receiver-distinguished in response to orthogonal time slots.

Since CDMA and TDMA communications are along wireless media, then the travel of those communications can be affected in many ways, and generally these effects are referred to as the channel effect on the communication. For example, consider a transmitter with a single antenna transmitting to a receiver with a single antenna. The transmitted signal is likely reflected by objects such as the ground, mountains, buildings, and other things that it contacts. In addition, there may be other signals that interfere with the transmitted signal. As a result, when the transmitted communication arrives at the receiver, it has been affected by the channel effect. As a result, the originally-transmitted data is more difficult to decipher due to the added channel effect. As a result of the channel effect, various approaches have been developed in an effort to reduce or remove that effect from the received signal so that the originally-transmitted data is properly recognized. In other words, these approaches endeavor to improve signal-to-noise ratio ("SNR"), thereby improving other data accuracy measures (e.g., bit error rate ("BER"), frame error rate ("FER"), and symbol error rate ("SER")). Several of these approaches are discussed below.

One approach to improve SNR is referred to in the art as antenna diversity, which refers to using multiple antennas at the transmitter, receiver, or both. For example, in the prior art, a multiple-antenna transmitter is used to transmit the same data on each antenna where the data is coded in some manner differently for each antenna. Examples of such encoding include space-time transmit diversity ("STTD"), wherein a first antenna transmits a block of two input symbols in a first order while a second antenna transmits, by way of example, the complex conjugates of the same block of two symbols and wherein those conjugates are output in a reversed order relative to how they are transmitted by the first antenna and the second symbol is a negative value relative to its value as an input. Accordingly, there is some redundancy in the sense that a symbol transmitted by one transmit antenna is also transmitted in another form along a different transmit antenna for the same transmitter. In any event, the approach of using more than one transmit antenna at the transmitter is termed transmit antenna diversity; similarly, using more than one receive antenna at the receiver is termed receive antenna diversity. Antenna diversity is also sometimes referred to as spatial diversity because each antenna in a set of either transmit or receiver antennas is separated from one another by some defined space. Still further, note that in the STTD system the transmitted signals represent blocks of symbols (or symbol samples) as opposed to single sequential symbols. This transmission of signals including such blocks is sometimes referred to as time diversity because each block of symbols represents a period of time. Also, where time diversity is combined with multiple transmit antennas such as in the example of an STTD system, then such a system is sometimes referred to as providing space time encoding. Another type of known space time encoding system is an orthogonal transmit diversity ("OTD") system. In an OTD system, a block of symbols is defined, such as a block of two symbols. Then, the first of the two symbols is transmitted twice along a first antenna, while at the same time the second of the two symbols is transmitted along the second antenna, with the second symbol being transmitted in an unchanged fashion first and then followed by the negative of that second symbol. In this manner, the signals along the first and second antennas are orthogonal with respect to one another. Further, here there also is redundancy, but in the sense that a symbol transmitted by one transmit antenna is also transmitted in another form along that same transmit antenna for the same transmitter. In any event, in a space time encoding system, in some instances (e.g., multiple-input multiple-output, discussed below) the receiver includes the same, or a greater, number of antennas as the transmitter, whereas in others (e.g., single STTD, single OTD) the number of receive antennas may be less than the transmitting antennas because the receive antenna is receiving orthogonal signals. Of course, in any event each receiver antenna receives signals from all of the transmit antennas, and these signals also are affected by respective channel effects. Thus, the receiver operates to exploit the use of its multiple antennas as well as recognizing the use of multiple transmit antennas in an effort to more accurately estimate the data streams transmitted by the transmitter.

Another approach to improve SNR combines antenna diversity with the need for higher data rate. Specifically, a closed-loop multiple-input multiple-output ("MIMO") system with transmit diversity has been devised, where each transmit antenna transmits a distinct and respective data stream. In a MIMO system, each transmit antenna transmits symbols that are independent from the symbols transmitted by any other transmit antennas for the transmitter, and there is no redundancy either along a single or with respect to multiple of the transmit antennas. Thus, the advantage of a MIMO scheme using distinct and non-redundant streams is that it can achieve higher data rates as compared to a transmit diversity system.

Certain of the above techniques have been combined in a written description entitled "Multiple Antennas and Multiuser Detection in High Data Rate Systems," by Howard Huang and Harish Viswanathan (0-7803-5718-3/00, copyright 2000 by IEEE). Particularly, the description proposes a high data rate system in which a base station transmits to a single user at a time on 16 CDMA channels. Multiple transmit antennas are provided to permit space-time spreading ("STS"), which is analogous in certain respects to the above-discussed STTD approach and which achieves transmit diversity. The description also states that this technique, sometimes known as Bell Labs Layered Space-Time ("BLAST") transmission, requires multiple receive antennas and multi-user detection to spatially resolve the mutually interfering signals.

While the preceding approaches and proposals provide steady improvements in wireless communications, the present inventors recognize that still further improvements may be made, including by addressing some of the drawbacks of the prior art. As one example of a drawback, older CDMA systems used a greater number of chips to modulate each complex symbol, where this number of chips per symbol is typically referred to as the spreading factor (or spreading gain). However, more recently, systems are being developed and often expressly required to use a lower spreading factor, such as in the case of certain high date rate implementations under 3 GPP. Due to the lower spreading factor, however, the duration for transmitting a complex symbol has been considerably reduced over previous CDMA systems, and as a result the symbol duration is much closer in time to the duration of the channel delay spread. Consequently, the orthogonality provided by the use of different CDMA codes is diminished, thereby jeopardizing receiver performance. Specifically, recall from earlier that CDMA signals incur a channel effect between the transmitter and receiver. One result of the channel effect is that when a signal is transmitted, that same transmitted signal arrives at the receiver at different times, that is, having traveled different lengths due to reflections in the channel between the transmitter and receiver; each different arrival of the same originally-transmitted signal is typically referred to as a multipath. Typically, multipaths interfere with one another. In CDMA, one type of multipath interference effect is multiuser interference ("MUI"). Also in CDMA as well as TDMA, multipaths causes interference effects that are sometimes referred to as intersymbol interference ("ISI") because each path includes transmitted data referred to as symbols. Ideally, however, the orthogonality implemented by CDMA reduces ISI to a negligible value and, as a result, often a less complex receiver structure may be implemented in a CDMA system. However, the above-described lowering of the spreading factor reduces the benefit of orthogonality and consequently increases the concern for ISI. Many earlier designs or proposals fail to adequately address this newly-developing problem. In a similar manner, the above-discussed paper by Huang and Viswanathan proposes a transmission technique without detailing how to implement a practical and feasible receiver, particularly given the potential of so-called multipaths and the increased likelihood of ISI. As another example of a drawback, certain of the above-described systems are limited in data rates, and there is therefore a benefit in developing a system with still further improvements in data rate.

In view of the above, there arises a need to address the drawbacks of the prior art and the preceding proposals, as is achieved by the preferred embodiments described below.

BRIEF SUMMARY OF THE INVENTION

In the preferred embodiment, there is a wireless receiver for receiving multiple space time encoded signals from a plurality of transmit antenna sets, wherein the multiple space time encoded signals comprise a set of symbols and wherein each transmit antenna set is coupled to a corresponding encoder at a single transmitter. The receiver comprises a plurality of receive antennas and collection circuitry, coupled to the plurality of receive antennas, for collecting a plurality of signal samples for a plurality of successive time instances and from each of the plurality of receive antennas. The collected samples comprise samples of multipaths of the space time encoded signals. The receiver also comprises circuitry, coupled to the plurality of receive antennas, for determining a linear time invariant multiple-input multiple-output matrix in response to pilot values in the received multiple space time encoded signals. Finally, the receiver comprise circuitry for estimating at least selected ones of the symbols in response to the signal samples and the linear time invariant multiple-input multiple-output matrix. Other aspects are also disclosed and claimed.

BRIEF DESCRIPTION OF THE SEVERAL VIEWS OF THE DRAWING

FIG. 12 illustrates an electrical and functional block diagram of a receiver for receiving multiple OTD CDMA signals from and implementing MIMO equalization followed by OTD decoding.

DETAILED DESCRIPTION OF THE INVENTION

The preferred embodiments provide wireless space time encoded transmissions of symbols from a transmitter to a receiver, and the receiver receives multipaths in response to the transmissions and operates to produce estimates of the transmitted symbols from these multipaths. These embodiments may be implemented in various forms, where by way of example the variations may include different types of space time encoding as well as different wireless data formats. As an illustration of this scope, therefore, the following illustrates four examples, representing combinations of either STTD or OTD transmissions with either CDMA or TDMA data formats. Further, with respect to the transmissions, improved data rate is achieved by transmitting across corresponding multiple sets of transmission antennas. By way of example for STTD, therefore, a first pair of transmission antennas communicates a first pair of signals having an STTD encoding relative to one another, while a second pair of transmission antennas communicates a second pair of signals having an STTD encoding relative to one another and that is also independent of the first pair of communications. Thus, in this example, there are multiple sets of transmit antennas, each with their own STTD encoder. In other words, a multiple STTD encoder approach is achieved. Indeed, the preferred embodiments achieve other multiple space time encoding systems as well. To illustrate these as well as other alternatives, the preceding variations are shown below through four examples, namely: (i) multiple STTD for CDMA; (ii) multiple STTD for TDMA; (iii) multiple OTD for TDMA; and (iv) multiple OTD for CDMA. Further, for each of these four examples, two different receiver approaches are described.

Figure 1:
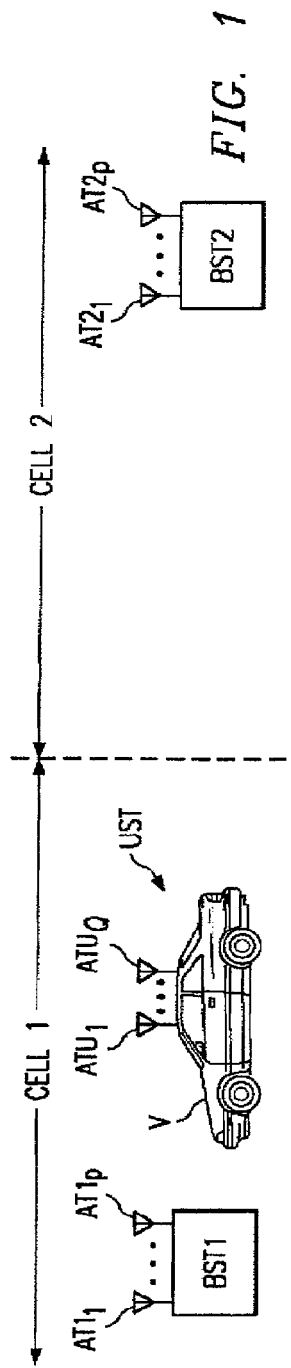
FIG. 1 illustrates a diagram of a cellular communications system by way of a CDMA or TDMA example, in which the preferred embodiments may operate.

FIG. 1 illustrates a diagram of a cellular communications system 10 by way of a CDMA or TDMA example, in which the preferred embodiments may operate. Within system 10 are shown two base stations BST1 and BST2. Each base station BST1 and BST2 includes a respective set of transmit antennas $AT1_1$ through $AT1_P$ and $AT2_1$ through $AT2_P$ through which each station may transmit or receive wireless signals. The general area of intended reach of each base station defines a corresponding cell; thus, base station BST1 is intended to generally communicate with cellular devices within Cell 1, while base station BST2 is intended to generally communicate with cellular devices within Cell 2. Of course, some overlap between the communication reach of Cells 1 and 2 exists by design to support continuous communications should a communication station move from one cell to the other. Indeed, further in this regard, system 10 also includes a user station UST, which is shown in connection with a vehicle V to demonstrate that user station UST is mobile. User station UST includes multiple antennas $ATU_1$ through $ATU_Q$ for both transmitting and receiving cellular communications. Lastly, one skilled in the art should appreciate that insofar as system 10 and the preferred embodiments apply to various CDMA systems, they also apply to WCDMA systems which are a type of CDMA system.

In some respects, system 10 may operate according to known general techniques for various types of cellular or other spread spectrum communications, including TDMA and CDMA communications. Such general techniques are known in the art and include the commencement of a call from user station UST and the handling of that call by either or both of base stations BST1 and BST2. Where system 10 differs from the prior art, however, is the system for, and method of, communicating multiple space time encoded signals from each of the set of base station antennas (e.g., $AT1_1$ through $AT1_P$) to user station UST and the receipt of multipaths from those communications with acceptable symbol estimation based on those multipaths. These distinctions are further detailed below in connection with FIGS. 2 through 13.

Figure 2:
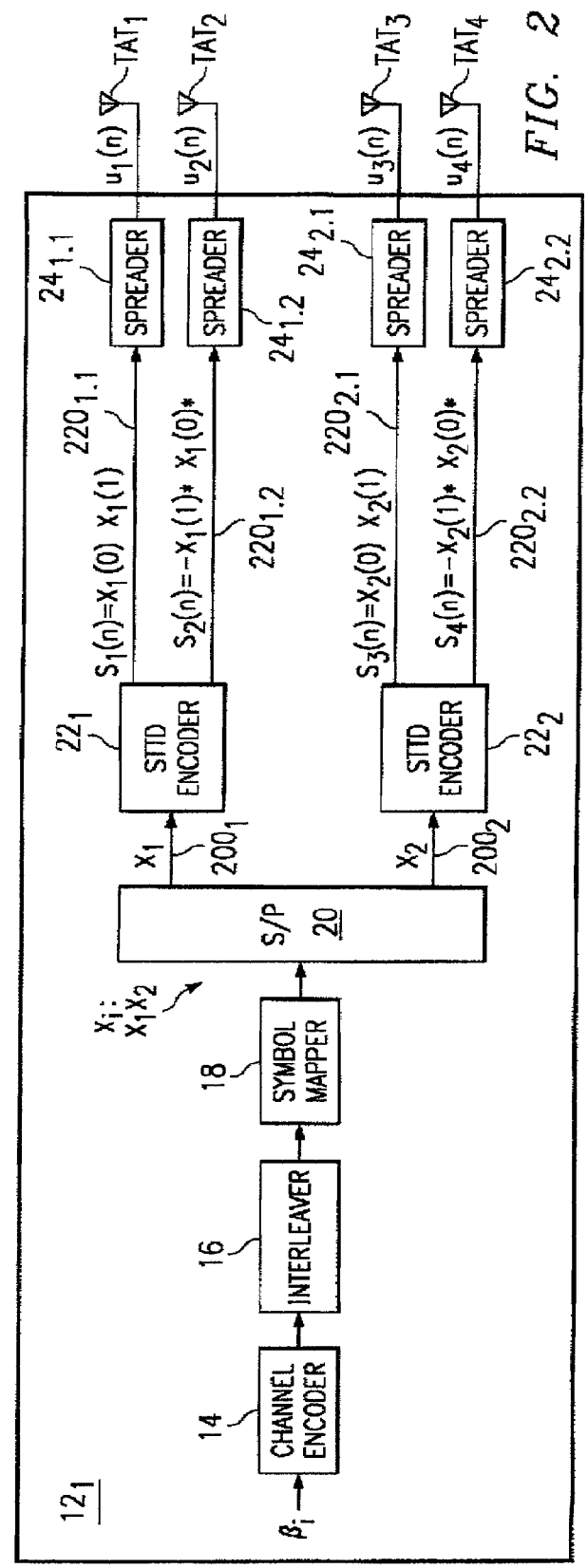
FIG. 2 illustrates an electrical and functional block diagram of a first transmitter that operates to transmit a multiple STTD encoded signal in a CDMA format.

FIG. 2 illustrates an electrical and functional block diagram of a first transmitter $12_1$ according to the preferred embodiment and which may be used for either or both of base stations BST1 and BST2 in FIG. 1. In various respects, transmitter $12_1$ may be constructed according to principles known in the art, but as further detailed below such known aspects are improved as a whole due to advancements in the construction and operation as relating to multiple space time encoding and receiver structures that may be used to process the signals transmitted by transmitter $12_1$. In general and as detailed below, transmitter $12_1$ operates to transmit multiple STTD encoded signals in a CDMA format to a receiver such as in user station UST of FIG. 1. Turning more specifically to transmitter $12_1$, it receives information bits $B_I$ at an input to a channel encoder 14. Channel encoder 14 encodes the information bits $B_I$ in an effort to improve raw bit error rate. Various encoding techniques may be used by channel encoder 14 and as applied to bits $B_I$, with examples including the use of convolutional code, block code, turbo code, or a combination of any of these codes.

The encoded output of channel encoder 14 is coupled to the input of an interleaver 16. Interleaver 16 operates with respect to a block of encoded bits and shuffles the ordering of those bits so that the combination of this operation with the encoding by channel encoder 14 exploits the time diversity of the information. For example, one shuffling technique that may be performed by interleaver 16 is to receive bits in a matrix fashion such that bits are received into a matrix in a row-by-row fashion, and then those bits are output from the matrix to a symbol mapper 18 in a column-by-column fashion.

Symbol mapper 18 converts its input bits to symbols, designated generally as $x_i$. The converted symbols $x_i$ may take various forms, such as quadrature phase shift keying ("QPSK") symbols, binary phase shift keying ("BPSK") symbols, or quadrature amplitude modulation ("QAM") sybmols. In any event, symbols $x_i$ may represent various information such as user data symbols, as well as pilot symbols and control symbols such as transmit power control ("TPC") symbols and rate information ("RI") symbols. Further, each symbol is preferably sampled and encoded as a number N samples of that symbol and, thus, by way of example, a symbol $x_1$ is sampled over time as $x_1(1)$, $x_1(2)$, and so forth through $x_1(N-1)$, symbol $x_2$ is sampled over time as $x_2(1)$, $x_2(2)$, and so forth through $x_2(N-1)$, and this sampling therefore applies to all symbols $x_i$.

Each symbol $x_i$ is coupled to a serial-to-parallel converter 20. In the preferred embodiment, serial-to-parallel converter 20 has a number of outputs equal to the number of symbol encoders for transmitter $12_1$. In the present example, transmitter $12_1$ includes two symbol encoders $22_1$ and $22_2$. Returning to serial-to-parallel converter 20, it therefore has two outputs $20o_1$ and $20o_2$ connected to the two symbol encoders $22_1$ and $22_2$, respectively. In response to its inputs, serial-to-parallel converter 20 receives the incoming symbols and outputs samples of those symbols in parallel streams along its outputs $20o_1$ and $20o_2$. By way of example, and for the sake of later reference, a stream of symbols $x_1$ and $x_2$ is shown input to serial-to-parallel converter 20. Thus, serial-to-parallel converter 20 outputs every other one of its inputs along every other of its outputs; accordingly, samples of symbol $x_1$ are provided at output $20o_1$ and samples of symbol $x_2$ are provided at output $20o_2$. Accordingly, the symbol sample outputs at a time (n) from serial-to-parallel converter 20 may be expressed as a vector x(n), as shown in the following Equation 1:

$$\underline{x}(n) = \begin{bmatrix} x_1(n) \\ x_2(n) \end{bmatrix} \qquad \text{Equation 1}$$

Each stream output from serial-to-parallel converter 20 is connected to a corresponding STTD encoder $22_1$ and $22_2$. Each STTD encoder $22_1$ and $22_2$ operates individually as known in the art; however, note that the inclusion of more than one such STTD encoder gives rise to the use of the description of transmitter $12_1$ as a multiple (i.e., more than one) STTD approach. Further, the use of multiple STTD encoders permits a first stream of symbols to be input to, and encoded by, STTD encoder $22_1$, while a second stream of symbols, independent from the first stream of symbols, is input to, and encoded by, STTD encoder $22_2$. As a result, overall data transmission rate is doubled versus that of a single STTD approach. Looking now to the specific operation performed by each STTD encoder $22_1$ and $22_2$, each such encoder operates in a comparable manner and, thus, encoder $22_1$ is described by way of example. Encoder $22_1$ first buffers a number of symbol samples equal to the number of transmit antennas to which it is coupled. In the example of FIG. 2, encoder $22_1$ is coupled (via spreaders discussed below) to two transmit antennas $TAT_1$ and $TAT_2$, so STTD encoder $22_1$ therefore buffers two symbol samples (e.g., $x_1(1)$ and $x_1(2)$). Next, STTD encoder $22_1$ outputs the buffered symbol samples toward antenna $TAT_1$ and, thus, symbol sample $x_1(1)$ for is transmission at a time $t_1$ and sample $x_1(2)$ is for transmission at a time $t_2$; for sake of reference later, let these symbols be represented as $s_1(n)$. During the same two time periods, however, and for transmission along antenna $TAT_2$, STTD encoder $22_2$ forms the complex conjugates of the symbol samples and reverses their order. Therefore, these two operations create, in the reversed order, a sequence of $x_1^*(2)$ and $x_1^*(1)$. Moreover, when output by STTD encoder $22_1$ and thus for transmission along antenna $TAT_2$, the negative value of the first of these two symbol samples is first output while thereafter the positive value of the second symbol sample is output. Accordingly, with respect to antenna $TAT_2$, a symbol sample $-x_1^*(2)$ is for transmission at time $t_1$ and a symbol sample $x_1^*(1)$ is for transmission at time $t_2$; for sake of reference later, let these symbols be represented as $s_2(n)$. From the symbol samples transmitted by STTD encoder $22_1$, a compatible receiver is therefore able to resolve the symbols in a manner that often yields favorable data error rates even given relatively large Doppler rates. Lastly, one skilled in the art should recognize that STTD encoder $22_2$ operates in a manner comparable to STTD encoder $22_1$, but relative to independent symbol data; thus, STTD encoder $22_2$ outputs toward transmit antenna $TAT_3$ a sequence $s_3(n)$ including $x_2(1)$ at $t_1$ and $x_2(2)$ at $t_2$, and STTD encoder $22_2$ outputs toward transmit antenna $TAT_4$ a sequence $s_4(n)$ including $-x_2^*(2)$ at time $t_1$ and $x_2^*(1)$ at time $t_2$.

Note also by way of an alternative example that if symbol samples $x_1(1)$ and $x_1(2)$ represented a symbol $x_1$ that was a BPSK symbol, then such symbol samples would include only real components (i.e., they do not include a complex component). In this case, STTD encoder $22_1$ would output, for transmission along antenna $TAT_1$, sample $x_1(1)$ at time $t_1$ and sample $x_1(2)$ at time $t_2$, while STTD encoder $22_1$ would output, for transmission along antenna $TAT_2$, sample $-x_1(2)$ at time $t_1$ and symbol $x_1(1)$ at time $t_2$. In this BPSK example and given the above description pertaining to STTD encoder $22_1$, one skilled in the art will appreciate that similarly STTD encoder $22_2$ operates to output $x_2(1)$ and $x_2(2)$ at times $t_1$ and $t_2$, respectively, along one of its outputs, while at those same respective times it outputs $-x_2(2)$ and $x_2(1)$ at the other of its outputs.

Regardless of the symbol type transmitted as shown by the above examples, from the preceding and for sake of later reference the outputs of STTD encoders $22_1$ and $22_2$, at a given time (n), may be expressed as a vector s(n), as shown in the following Equation 2:

$$s(n) = \begin{bmatrix} s_1(n) \\ s_2(n) \\ s_3(n) \\ s_4(n) \end{bmatrix} \qquad \text{Equation 2}$$

Moreover, for a collection of N samples at different times (n), then a vector s may be defined with respect to the vector s(n) of Equation 2, as shown in the following Equation 3:

$$\underline{s} = \begin{bmatrix} \underline{s}(0) \\ \underline{s}(1) \\ \vdots \\ \underline{s}(N-1) \end{bmatrix} \qquad \text{Equation 3}$$

Each of STTD encoders $22_1$ and $22_2$ has a pair of outputs connected to a corresponding pair of spreaders $24_{1,1}$ and $24_{1,2}$ or $24_{2,2}$ and $24_{2,2}$. Each spreader modulates its input by combining it with, or multiplying it times, a CDMA spreading sequence which can be a pseudo-noise ("PN") digital signal or PN code or other spreading codes (i.e., it utilizes spread spectrum technology), and it may be a single code or a multicode approach where the code(s) is the same for each transmitting antenna. In a single code instance, the different symbol streams to be transmitted by each transmit antenna $TAT_1$ and $TAT_2$ are multiplied times the same code. In a multicode instance, each input to a spreader is further divided into ds streams. Each of the ds streams is multiplied times a different and orthogonal code from a set of ds codes, where the same set of codes applies to each spreader $24_{1,x}$ and $24_{2,x}$. Also for each set of streams, after the multiplication times the codes, the resulting products are summed and output to a respective one of transmit antennas $TAT_1$ through $TAT_4$. In any event, for the sake of later reference, the convention u is used for each encoded symbol $x_l$ once it has passed through a spreader $24_{1,x}$ or $24_{2,x}$. Thus, similar to Equation 2 but here in the case of signal processing after the spreading function, then a vector u(n) of the transmitted signals across all four transmit antennas may be defined as in the following Equation 4:

$$\underline{u}(n) = [u_1(n) \ u_2(n) \ u_3(n) \ u_4(n)]^T = \begin{bmatrix} u_1(n) \\ u_2(n) \\ u_3(n) \\ u_4(n) \end{bmatrix} \quad \text{Equation 4}$$

In any event, the spreading sequence facilitates simultaneous transmission of information over a common channel by assigning each of the transmitted signals a unique code during transmission. Further, this unique code (or codes) makes the simultaneously-transmitted signals over the same bandwidth distinguishable at the receiver in user station UST (or other receivers). Finally, note that the outputs of each spreader $24_{1,x}$ or $24_{2,x}$ are coupled to respective antennas $TAT_1$ and $TAT_2$ or $TAT_3$ and $TAT_4$ for transmission of the processed signals, where such a coupling is further through an RF interface not shown to simplify the illustration and discussion.

As an additional observation before proceeding, for sake of a preferred embodiment and also as an illustrative example transmitter $12_1$ includes a total of four transmit antennas $TAT_1$ through $TAT_4$. However, one skilled in the art should recognize that many of the inventive teachings of this document may be applied to transmitters with an even number of antennas greater than four. For later reference, therefore, let P represent the number of transmit antennas. In such a case, the space time encoding (e.g., STTD) will be divided such that the transmitter includes a total of P/2 encoders, where each such encoder is operable to process and output data that is independent of the data processed by the other space time encoder(s).

Having illustrated transmitter $12_1$ as an example of a multiple (e.g., double) STTD transmitter using CDMA spreading, the preferred embodiments contemplate two different receiver techniques for such a transmitter. As a first technique, a receiver employs a multi-input multi-output ("MIMO") equalization approach that removes the channel effects for each received multipath, and the equalization is followed by despreading and STTD decoding. As a second technique, a receiver employs a joint interference cancellation approach, where the phrase "joint interference cancellation" indicates that in a mutual operation both the channel effects and the STTD encoding and spreading are removed from the received signals. Each of these techniques is detailed below. Lastly, note that still other receiver approaches could be implemented. For example, a MIMO interference cancellation followed by STTD decoding could be used; however, such an approach is likely undesirable because such an approach would necessarily require a greater deal of complexity while achieving only comparable performance to alternative approaches. As another example, instead of a joint interference cancellation approach, a RAKE structure could be used. Still other examples may be ascertained by one skilled in the art.

Figure 3:
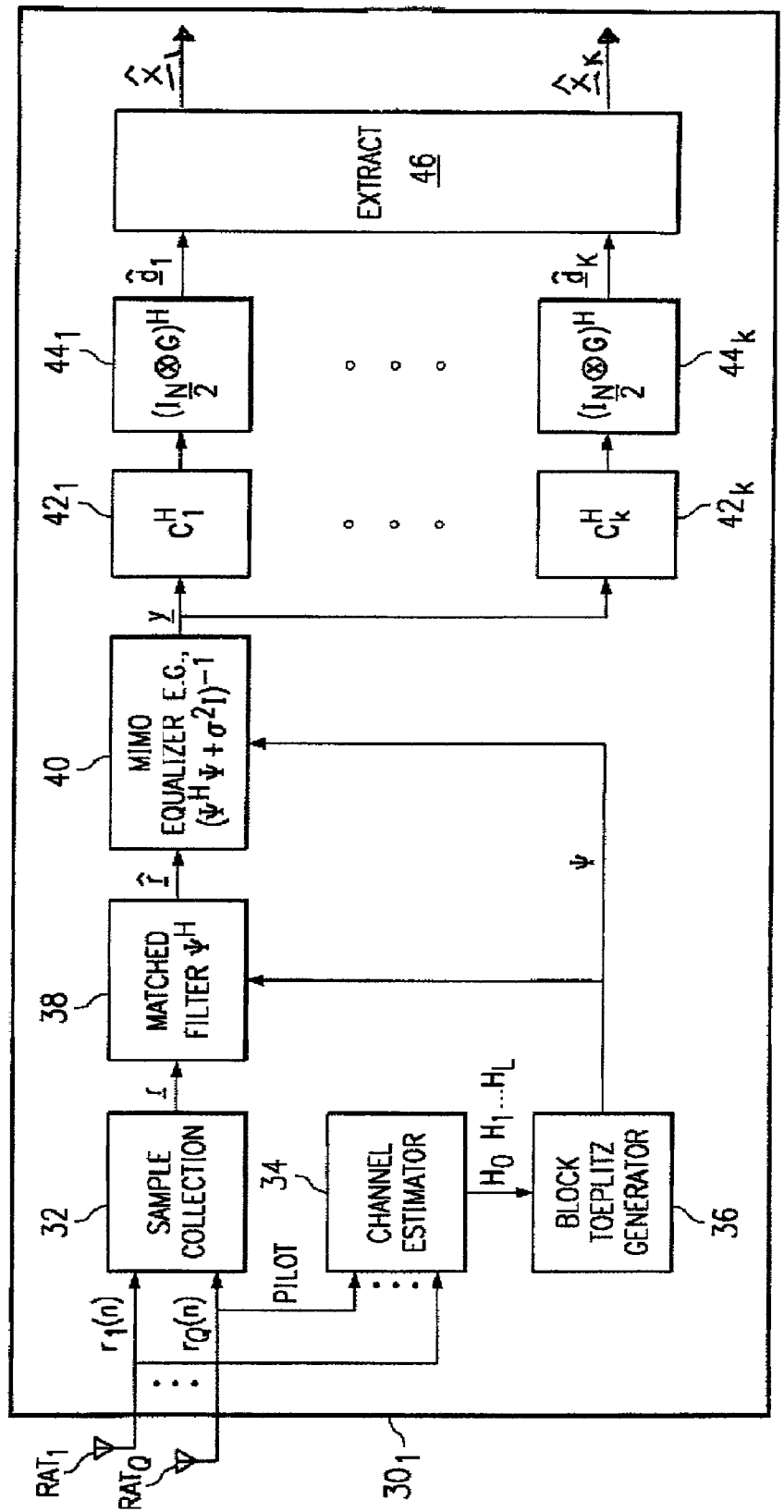
FIG. 3 illustrates an electrical and functional block diagram of a receiver for receiving multiple STTD CDMA signals wherein a MIMO equalization approach is implemented and is followed by despreading and STTD decoding.

FIG. 3 illustrates an electrical and functional block diagram of a receiver $30_1$ for receiving multiple STTD CDMA signals from transmitter $12_1$ of FIG. 2, where receiver $30_1$ represents the example introduced above wherein a MIMO equalization approach is implemented and is followed by despreading and STTD decoding. Receiver $30_1$ includes a total of Q receive antennas $RAT_1$ through $RAT_Q$, where the actual value of Q is discussed later. By way of introduction to various signal processing aspects discussed below, note that each receive antenna $RAT_x$ receives a signal from each of the P transmit antennas $TAT_1$ through $TAT_P$. For the sake of convention, let each of the received signals be indicated as r and, thus, for a number Q of symbol samples received at a time (n), then a vector of the received signals across all Q receive antennas may be defined as in the following Equation 5:

$$\underline{r}(n) = \begin{bmatrix} r_1(n) \\ r_2(n) \\ \vdots \\ r_Q(n) \end{bmatrix} \quad \text{Equation 5}$$

Each receive antenna $RAT_1$ through $RAT_Q$ is connected to a sample collection block 32, which includes an appropriate RF interface (not separately shown) and operates to collect a sufficient number N of preferably chip-level samples corresponding to N transmitted symbol samples, that is, it samples at the chip rate which is defined according to the applicable spreading factor ("SF"). Note that the choice of chip-level samples is a preferred approach and by way of example, where other sample rates such as a sub-chip-level rate could be implemented. In any event, to appreciate the collections obtained by block 32, first note that based on such a chip-level collection of samples and for sake of subsequent signal processing, these collected samples at a time (n) may be expressed using the vector in Equation 5 and in view of other vectors as written mathematically as shown in the following Equation 6:

$$\underline{r}(n) = \sum_{k=1}^{K} \sqrt{p_k} \sum_{l=0}^{L_k} H_{k,l} \underline{u}_k(n-l) + \underline{\eta}(n) \quad \text{Equation 6}$$

In Equation 6, H is the channel between the transmit and receive antennas, K is the number of distinct codes which could belong to one user or multiple users, $L_k$ is the number of paths for the $k^{th}$ code thereby representing delayed receipt of different paths corresponding to the $k^{th}$ code (i.e., multipaths), $p_k$ is the power corresponding to the $k^{th}$ user, and $\eta(n)$ is a noise term.

For reasons better understood later, note also in the preferred embodiment that sample collection block 32 collects a total of N samples of r(n) of Equation 6 at different times (n). This entire collection may be expressed as a vector r, as defined by the following Equation 7:

$$\underline{r} = \begin{bmatrix} \underline{r}(0) \\ \underline{r}(1) \\ \vdots \\ \underline{r}(N-1) \end{bmatrix} \quad \text{Equation 7}$$

Further with respect to the value N, note in prior art space time encoded systems there is an expectation of orthogonality in the transmitted signals, and similarly prior art receivers are constructed and operate according to this expectation. As a result, typically for a single path (i.e., no multipaths) a receiver collects only a number of symbols samples corresponding to the number of symbol intervals transmitted in the space timed encoded format. For example, for STTD which transmits its symbols in groups of two symbols, then the prior art receiver collects symbol samples spanning only a period equal to or less than two symbol times. In contrast, in the preferred embodiments discussed in this documents, there is the recognition that multipaths may arise in the received signals, thereby diminishing the orthogonality in the received signals; consequently, sample collection block 32 establishes N at a value so that the number of samples span more than the number of symbol times used by the space time encoding transmitter to transmit a group of symbols. Thus, in the previous example for STTD wherein the transmitter transmits symbols in groups of two (i.e., over two symbol times), then N is established by sample collection block 32 so that more than two symbol periods are sampled for each sample set. The sample set is then processed in a manner based on the specific embodiment, as further detailed for numerous receivers below.

Additional detail is now directed to the matrix $H_{k,l}$ in Equation 6, first by looking in contrast at a prior art MIMO system considering only a single path. For example, consider a MIMO system with four transmit antennas numbered 1 through 4 and four receive antennas numbered 1 through 4. Thus, each signal passing from a transmit antenna to a receiver antenna has an associated channel effect value $h_{ab}$, where the first subscript a designates the receive antenna and the second subscript b designates the transmit antenna. Accordingly, as an example of a single matrix $H_{k,l}$, that is, for a single value of K and a single value of L, the matrix H be defined with respect to the signals and channel effect as between each signal transmitted from each of the four transmit antennas and received by each of the four receive antennas and, thus, it has dimensions Q×P, as shown in the following Equation 8:

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \quad \text{Equation 8}$$

Turning to the preferred embodiment, it involves the receipt and processing of multipaths as opposed to a single path and these multipaths will be received in the collection of N samples included in r. In response to r, the preferred embodiments provide for additional signal processing with respect to the channel effect on the multipaths. In this regard, for a given value of K, and for the varying values of L, the channel effect matrix of Equation 8 is expanded into the form of a block Toeplitz matrix designated $\Psi$, where $\Psi$ represents a linear time invariant multiple-input multiple-output filtering process on the multi-dimensional signal vector due to the mulitpli-input (i.e., P) multiple-output (Q) finite impulse response ("FIR") channel. Further, as known in mathematics a block Toeplitz matrix includes constant diagonals starting from its center diagonal and downward, with zero terms above the center diagonal and below the last of the non-zero diagonals as shown in the following Equation 9. Further, due to its correspondence with the collection of N samples, the matrix $\Psi$ has dimensions N(SF)Q×N(SF)P:

$$\Psi = \begin{bmatrix} H_0 & 0 & 0 & 0 & 0 & 0 \\ H_1 & H_0 & 0 & 0 & 0 & 0 \\ \vdots & H_1 & \ddots & 0 & 0 & 0 \\ \vdots & \ddots & \ddots & \ddots & 0 & 0 \\ H_L & \ddots & \ddots & H_1 & H_0 & 0 \\ 0 & H_L & \cdots & H_2 & H_1 & H_0 \end{bmatrix} \quad \text{Equation 9}$$

Returning now to receiver 30$_1$ in FIG. 3, note that each receive antenna $RAT_1$ through $RAT_Q$ also provides pilot symbols to a channel estimator 34. These pilot symbols are typically communicated in a separate channel such as the known common pilot channel ("CPICH"). In such a case, the pilot symbols are spread by transmitter 12$_1$ with a code that differs from the code(s) used to spread the data channel. Alternatively, pilot symbols could be included in the same channel as the data symbols in which case both the pilot and data symbols are spread with the same code. In either approach, the spreading of the pilot symbols requires a despreading operation at receiver 30$_1$, although such a despreading may be independent of the despreading of the remaining symbols received by receiver 30$_1$ and, hence, pilot despreading is not explicitly shown in FIG. 3. In any case, in response to the pilot symbols, channel estimator 34 estimates, from the received pilot symbols, the various channel estimate values of $H_0$, $H_1$, through $H_L$ shown in Equation 9. Thereafter, channel estimator 34 outputs the various values of $H_0$, $H_1$, through $H_L$ to a block Toeplitz generator 36, which develops those values into the form of Equation 9, that is, to form the value $\Psi$. For reasons detailed below, the value $\Psi$ is output to a matched filter 38 and also to a MIMO equalizer 40.

In addition to receiving the value of $\Psi$ from block Toeplitz generator 36, matched filter 38 also receives the value r from sample collection block 32. The processing of that value, using the value of $\Psi$, is now demonstrated by first presenting an understanding of the mathematical relationship of the various signal aspects within r. Given these two values, the functionality of receiver 30$_1$ is now established, and to better provide an understanding of such functionality various mathematical relationships are shown, from which the remaining blocks of receiver 30$_1$ should be understood. Indeed, also from these mathematical relationships, the following illustrates how the receiver blocks can implement desired operations to accommodate the effects of those relationships to thereby recover the transmitted symbols, while one skilled in the art may appreciate that other approaches also may be selected and implemented in order to exploit these same mathematical relationships.

By substituting the block Toeplitz matrix of Equation 9 into Equation 6 and with respect to all N collected samples, the following Equation 10 for r is provided:

$$r = \sum_{k=1}^{K} \sqrt{p_k}\, \Psi_k \underline{u}_k + \eta \qquad \text{Equation 10}$$

In Equation 10, r is a vector of dimension (N)(SF)(Q)×1, and $u_k$ is a vector of dimension (N)(SF)(P)×1, which has elements for each time (n) and of the form shown in the following Equation 11:

$$u_k = \begin{bmatrix} u_k(0) \\ u_k(1) \\ \vdots \\ u_k(N-1) \end{bmatrix} \qquad \text{Equation 11}$$

Further, from FIG. 2 and the input and output of each spreader $24_{1,x}$ and $24_{2,x}$, it may be appreciated that each element of $u_k(n)$ is a product of a spreading code (or codes) with an output from an STTD encoder, as shown in the following Equation 12:

$$u_k = \begin{bmatrix} c_{k,0}(n)s_k(n) \\ c_{k,1}(n)s_k(n) \\ \vdots \\ c_{k,SF-1}(n)s_k(n) \end{bmatrix} = \underline{c}_k(n) \otimes s_k(n) \qquad \text{Equation 12}$$

In Equation 12, the operator $\otimes$ indicates the Kronecker matrix product, which can be illustrated by the example of the matrix A and any matrix B as shown in the following Equation 12.1:

$$\text{for } A = \begin{bmatrix} a_{11} & a_{12} \\ a_{21} & a_{22} \end{bmatrix}, \qquad \text{Equation 12.1}$$

$$\text{then } A \otimes B = \begin{bmatrix} a_{11} & a_{12} \\ a_{21} & a_{22} \end{bmatrix} = \begin{bmatrix} a_{11}B & a_{12}B \\ a_{21}B & a_{22}B \end{bmatrix}$$

Also in Equation 12, $s_k(n)$ is a vector of P×1 elements corresponding to the encoded symbol samples as introduced earlier with respect to Equation 2, and $c_k(n)$ is a vector of the spreading code at time (n) and having SF elements as shown in the following Equation 13:

$$c_k(n) = [c_{k,0}(n), c_{k,1}(n), c_{k,2}(n), \ldots, c_{k,SF-1}(n)]^T \qquad \text{Equation 13}$$

Having established various relationships between the transmitted and received signals, the following additional manipulations may be made to those relationships in order to provide a receiver that may be implemented in various manners. First, in mathematics, the Kronecker product identity is defined according to the following Equation 14:

$$AB \otimes CD = AC \otimes BD \qquad \text{Equation 14}$$

By applying Equation 14 to Equation 13, the identity can be used to re-state Equation 12 in the terms of the following Equation 15:

$$u_k = c_k(n) \otimes s_k(n) = (c_k(n) \otimes I_P)s_k(n) \qquad \text{Equation 15}$$

In Equation 15, $I_P$, is an identity matrix of a dimension specified by its subscript, namely, of dimension P×P (where this convention for other matrices is also used elsewhere in this document) Thus, the matrix $u_k$ of Equation 15 can be written as shown in the following Equation 16:

$$u_k = \begin{bmatrix} (\underline{c}_k(0) \otimes I_P)s_k(0) \\ (\underline{c}_k(1) \otimes I_P)s_k(1) \\ \vdots \\ (\underline{c}_k(N-1) \otimes I_P)s_k(N-1) \end{bmatrix} \qquad \text{Equation 16}$$

Next, Equation 16 may be further broken down into a product of a matrix and vector as shown in the following Equation 17:

$$u_k = \qquad \text{Equation 17}$$

$$\begin{bmatrix} \underline{c}_k(0) \otimes I_P & 0 & 0 & 0 \\ 0 & \underline{c}_k(1) \otimes I_P & 0 & 0 \\ 0 & 0 & \ddots & 0 \\ 0 & 0 & 0 & \underline{c}_k(N-1) \otimes I_P \end{bmatrix} \begin{bmatrix} s_k(0) \\ s_k(1) \\ \vdots \\ s_k(N-1) \end{bmatrix}$$

Next, let each of the two matrices from Equation 17 be defined by a $k^{th}$ spreading code response matrix $C_k$ for systems with P transmit antennas in the following Equation 18 and a a $k^{th}$ data symbol vector $s_k$ in the following Equation 19:

$$C_k = \begin{bmatrix} \underline{c}_k(0) \otimes I_P & 0 & 0 & 0 \\ 0 & \underline{c}_k(1) \otimes I_P & 0 & 0 \\ 0 & 0 & \ddots & 0 \\ 0 & 0 & 0 & \underline{c}_k(N-1) \otimes I_P \end{bmatrix} \qquad \text{Equation 18}$$

$$s_k = \begin{bmatrix} s_k(0) \\ s_k(1) \\ \vdots \\ s_k(N-1) \end{bmatrix} \qquad \text{Equation 19}$$

From the preceding, Equation 10 defining the value of r can be re-written in the form of the following Equation 20:

$$r = \sum_{k=1}^{K} \sqrt{p_k}\, \Psi_k C_k s_k + \eta \qquad \text{Equation 20}$$

Returning briefly to FIG. 1, note that user station UST is preferably mobile and is typically associated with a greater communication of information in the downlink direction, that is, from one of base stations BST1 or BST2 to user station UST. As a result, efforts are often made, and may be achieved by the preferred embodiments, by improving communications in the downlink direction. Given this aspect, the preceding Equations now may be further refined and thereafter implemented in receiver $30_1$ for the sake of receiving such downlink communications. In this regard, for a single user station UST, there is not a need to consider all paths to all user stations but, instead, only to consider each path received by the given user station UST. Mathematically, therefore, the following Equation 21 may be assumed:

$$\Psi_k = \Psi \quad \text{Equation 21}$$

Thus, where Equation 21 may be used in certain of the preferred embodiments, downlink communications may be achieved. For example, by substituting Equation 21 into Equation 20, the following Equation 22 is realized, wherein the value $\Psi$, which is independent of K as shown in Equation 21, may be removed from inside the summation as follows:

$$r = \Psi \sum_{k=1}^{K} \sqrt{p_k}\, C_k s_k + \eta \quad \text{Equation 22}$$

Next, the value of $s_k$ in Equation 19 may be further broken down in terms of a vector $d_k$ as is now explored. First, let $d_k$ be defined according to the following Equation 23:

$$d_k = \begin{bmatrix} x_k(0) \\ x_k^*(0) \\ x_k(1) \\ x_k^*(1) \\ \vdots \\ x_k(N-1) \\ x_k^*(N-1) \end{bmatrix} \quad \text{Equation 23}$$

In Equation 23, each value $x_k(n)$ is a vector for the $k^{th}$ code and having dimension P/2×1 as shown in the following Equation 24:

$$x_k(n) = \begin{bmatrix} x_{1,k}(n) \\ \vdots \\ x_{\frac{P}{2},k}(n) \end{bmatrix} \quad \text{Equation 24}$$

In Equation 24, each element, $x_{a,k}(n)$, represents one of the a through P/2 inputs to an STTD encoder in the transmitter. Second, a matrix G with fixed values having a dimension of 2P×2P may be defined, which satisfies the relationship between $s_k$ and $d_k$, according to the following Equation 25

$$s_k = \left(I_{\frac{N}{2}} \otimes G\right) d_k \quad \text{Equation 25}$$

In Equation 25, $$I_{\frac{N}{2}}$$

is an identify matrix of dimension N/2 and the Kronecker product $$\left(I_{\frac{N}{2}} \otimes G\right)$$

is unitary, where note also that $$\left(I_{\frac{N}{2}} \otimes G\right)$$

describes the STTD encoding operation imposed on the signals by transmitter $12_1$. Further, for the example of FIG. 2 wherein P=4, then with respect to $s_k(0)$ and $s_k(1)$, the matrix G can be shown to be a matrix of fixed values, as is shown in the following Equation 26:

$$\begin{bmatrix} s_k(0) \\ s_k(1) \end{bmatrix} = G \begin{bmatrix} x_k(0) \\ x_k^*(0) \\ x_k(1) \\ x_k^*(1) \end{bmatrix} \begin{bmatrix} 1 & 0 & 0 & 0 & 0 & 0 & 0 & 0 \\ 0 & 0 & 0 & 0 & 0 & 0 & -1 & 0 \\ 0 & 1 & 0 & 0 & 0 & 0 & 0 & 0 \\ 0 & 0 & 0 & 0 & 0 & 0 & 0 & -1 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 1 & 0 & 0 \\ 0 & 0 & 0 & 0 & 1 & 0 & 0 & 0 \end{bmatrix} \begin{bmatrix} x_k(0) \\ x_k^*(0) \\ x_k(1) \\ x_k^*(1) \end{bmatrix} \quad \text{Equation 26}$$

By substituting the value of $s_k$ in Equation 25 into Equation 22, the following Equation 27 is realized:

$$r = \Psi \sum_{k=1}^{K} \sqrt{p_k}\, C_k \left(I_{\frac{N}{2}} \otimes G\right) d_k + \eta \quad \text{Equation 27}$$

Equation 27 therefore demonstrates that from the received value of r, and given knowledge of the codes $C_k$, the identify matrix $$I_{\frac{N}{2}},$$

and the fixed values for the matrix G, then a determination may be made of the originally-transmitted symbols included in the vector $d_k$.

Returning now to FIG. 3, it illustrates one preferred embodiment suggested above, namely, where receiver $30_1$ is constructed to include a matched filter 38 that is followed by a MIMO equalizer 40, where the MIMO equalizer 40 is followed by despreaders $42_1$ through $42_K$, and finally where despreaders $42_1$ through $42_K$ are followed by respective STTD decoders $42_1$ through $42_K$. Each of these various blocks is functionally described below.

The operation of matched filter 38 may be appreciated by reference to Equation 27, where recall given the assumption of Equations 21 and 22 that the term $\Psi$ is removed from the summation; accordingly, this permits the operation of receiver $30_1$ to first remove the effect of that term and thereafter to extract the symbols with reference to the other terms in Equation 27. To remove the effect of the term $\Psi$, a matched filter 38 (e.g., maximal ratio combining) operation is performed, which multiplies the received signal times the Hermitian of the channel effect, that is, it multiplies the received signal times $\Psi^H$ in an effort to estimate the received signal absent the effect of the channel. Mathematically, therefore, this operation may be stated as shown in the following Equation 28:

$$\hat{r}=\Psi^H r \qquad \text{Equation 28}$$

From Equation 28, matched filter 38 outputs the estimated value $\hat{r}$. Further, from FIG. 3, this value is then output to MIMO equalizer 40. In practice, this operation can be implemented using a multiple-input, multiple-output FIR filtering approach, as should be known to one skilled in the art.

The operation of MIMO equalizer 40, which receives both the value $\hat{r}$ from matched filter 38 and the value $\Psi$ from block Toeplitz generator 36, is now discussed. By way of introduction, note at the outset that in prior art space time encoded systems, there is an expectation of orthogonality in the transmitted signals, and similarly prior art receivers are constructed and operate according to this expectation. As a result, for multiple space time encoding, there is no suggestion in the art relating to a lack of orthogonality. In contrast, in the preferred embodiments discussed in this documents, there is the recognition that multipaths may arise in the received signals, thereby diminishing the orthogonality in the received signals; consequently, each preferred receiver includes a form of multipath suppression, that is, to suppress the interference effects caused by multipaths, where in receiver 30$_1$ MIMO equalizer 40 performs the multipath suppression. This operation also may be demonstrated by looking at the mathematics relating to the previous processed signals, as is now explored. The estimated value $\hat{r}$ of Equation 28 may be re-written by substituting the value of r from Equation 27 into Equation 28, thereby yielding the following Equation 29:

$$\hat{r} = \Psi^H \Psi \sum_{k=1}^{K} \sqrt{p_k}\, C_k \left( I_{\frac{N}{2}} \otimes G \right) d_k + \Psi^H \eta \qquad \text{Equation 29}$$

For the sake of simplification, let the entire summation shown in Equation 29 hereafter be referred to as $\beta$. Further, with Equation 29 having demonstrated an estimate for the received signal absent the channel effect, at least the following approaches are contemplated for the preferred embodiment of MIMO equalizer 40 and include: (i) zero forcing or minimum mean square error ("MMSE"); (ii) 1-shot (i.e., linear) or iterative; (iii) 1-stage or multistage; and (iv) maximum likelihood detection. Certain of these techniques also may be combined, as is known, such as with a linear MMSE, an iterative MMSE, a linear zero forcing, and an iterative zero forcing. Moreover, such approaches may be implemented in various manners. For example, a linear equalizer can be implemented using multiple-input multiple-output FIR filtering. As another example, a linear approach can be implemented using a series of multiple-input multiple-output FIR filtering operations. As still another example, equalizer taps also can be trained using adaptive filtering techniques, as may be ascertained by one skilled in the art.

By way of example, receiver 30$_1$ is shown in FIG. 3 to implement a linear MMSE in its MIMO equalizer 40. In a linear MMSE architecture, it is known that the estimate $\hat{r}$ may be further processed to yield a signal that may be later de-spread, where the yielded signal is designated y as shown in the following Equation 30:

$$y=(\Psi^H\Psi+\sigma^2 I)^{-1}\hat{r} \qquad \text{Equation 30}$$

In Equation 30, $\sigma^2$ is the square of the noise variance. Next, the value of $\hat{r}$ from Equation 29 may be substituted into Equation 30, yielding the following Equation 31:

$$y=(\Psi^H\Psi+\sigma^2 I)^{-1}\Psi^H\Psi\beta+(\Psi^H\Psi+\sigma^2 I)^{-1}\Psi^H\eta \qquad \text{Equation 31}$$

Equation 31 reduces to, and may be re-written as in the following Equation 32:

$$y=\beta+\epsilon \qquad \text{Equation 32}$$

In Equation 32, $\epsilon$ is residual interference plus noise. In view of the preceding, in the preferred embodiment example illustrated in FIG. 3, MIMO equalizer 40 determines y from $\hat{r}$ using the value of $\Psi$ (and $\Psi^*$) as shown in Equation 30, and the determined value y is then output to a group of despreaders 42$_1$ through 42$_K$ detailed below.

The operation of despreaders 42$_1$ through 42$_K$, each of which receives the value y, is now discussed and also may be appreciated in terms of various signal manipulations as illustrated through mathematics. Recall that the entire summation shown earlier in Equation 29 is referred to as $\beta$. Thus, Equation 32 may be re-written by substituting the specific terms of $\beta$ into Equation 32 to realize the following Equation 33:

$$y = \sum_{k=1}^{K} \sqrt{p_k}\, C_k \left( I_{\frac{N}{2}} \otimes G \right) d_k + \varepsilon \qquad \text{Equation 33}$$

Given Equation 33, one skilled in the art will appreciate that the symbol data, $d_k$, may be estimated by removing the terms $C_k$ and $$\left( I_{\frac{N}{2}} \otimes G \right)$$

from y. Toward this end, despreaders 42$_1$ through 42$_K$ operate to remove the effects of $C_k$, which is illustrated in FIG. 3 in that despreader 42$_1$ multiplies y times the Hermitian of $C_k$ corresponding to k=1, that is, it multiplies times $C_1^H$, while despreader 42$_2$ (not expressly shown) multiplies y times $C_2^H$, and so forth through the final despreader 42$_K$ which multiplies y times $C_K^H$. Each of despreaders 42$_1$ through 42$_K$ provides its output to a corresponding STTD decoder 44$_1$ through 44$_K$.

The operation of STTD decoders 44$_1$ through 44$_K$ also may be appreciated with respect to Equation 33. Particularly, since despreaders 42$_1$ through 42$_K$ remove the effects of $C_k$, then each of decoders 44$_1$ through 44$_K$ removes the remaining effect of $$\left( I_{\frac{N}{2}} \otimes G \right),$$

that is, it essentially performs a linear transformation to invert or undo the effect of STTD encoding. This operation is performed by each decoder multiplying its input times the Hermitian of $$\left( I_{\frac{N}{2}} \otimes G \right),$$

that is, times $$\left(I_{\frac{N}{2}} \otimes G\right)^H.$$

As a result, the remaining signal output by each of STTD decoders $44_1$ through $44_K$, ignoring the noise that may exist in a contribution from $\epsilon$, constitutes a corresponding estimate of $d_1$ through $d_k$. For sake of convention, each such respective estimate is shown in FIG. 3 as $\hat{d}_1$ through $\hat{d}_k$.

The outputs $\hat{d}_1$ through $\hat{d}_k$ of STTD decoders $44_1$ through $44_K$ are coupled to an extract block 46. By way of example, extract block 46 is shown to correspondingly provide outputs $\hat{x}_1$ through $\hat{x}_k$. These outputs therefore represents estimates of the transmitted symbol data $x_1$ through $x_k$. Note, however, that in many instances a given receiver will have interest only in one of the K codes and, thus, for that case only a single value of $\hat{x}_K$ might be produced, or some subset of all the K codes may be at interest and the receiver may corresponding provide each value of $\hat{x}$ for the values of K at interest. In any event, the operation of extract block 46 may be appreciated by returning to Equation 23. Specifically, Equation 23 indicates that for a given value $\hat{d}_k$, then $\hat{x}_k$ for a given time sample (n) will be provided followed by its conjugate. Accordingly, extract block 46 may merely discard every other value input from $\hat{d}_k$, thereby discarding the conjugate values and yielding as outputs the values $\hat{x}_k(0)$, $\hat{x}_k(1), \ldots, \hat{x}_k(N-1)$.

From the above, various observations may be made with respect to receiver $30_1$ of FIG. 3, including certain advantages it provides. First, with respect to the recovery of $\hat{x}$, for a single download receiver it is likely that only a single value of K is of interest, that is, other codes and other users (receivers) are only of interest to other respective users. Accordingly, for the sake of despreading, rather than requiring a total of despreaders $42_1$ through $42_K$ to remove the effects of all codes $C_1$ through $C_K$, only one despreader corresponding to the value of K at interest is needed and receiver $30_1$ therefore only need be informed of that single code. This is relevant and indeed may call for this implementation in multi-user scenarios wherein each receiver is informed only of its own code. However, for a single user with multiple codes (i.e., K codes), this does not matter. Further, for the implementation of receiver $30_1$, note that the number of receive antennas Q should equal or exceed the number of transmit antennas P. This aspect may be appreciated by recalling the dimensions of matrix $\Psi$, which recall are dimensions N(SF)Q×N(SF)P. For receiver $30_1$ to perform at a desirable level so as to reliably separate and estimate all NP symbols, then essentially it is solving for unknown values given a number of known values (i.e., received value), which in a matrix sense is realized in that the columns of the matrix $\Psi$ represent the known values whereas the rows represent the equations from which the unknowns may be determined. Accordingly, in the case of the dimensions of the matrix $\Psi$, it is desirable that N(SF)Q$\geq$N(SF)P; the values N(SF) may be removed from both sides of this observation, leaving an indication of Q$\geq$P, thereby reflecting the above observation that it is desirable that the number of receive antennas Q should equal or exceed the number of transmit antennas P.

Figure 4:
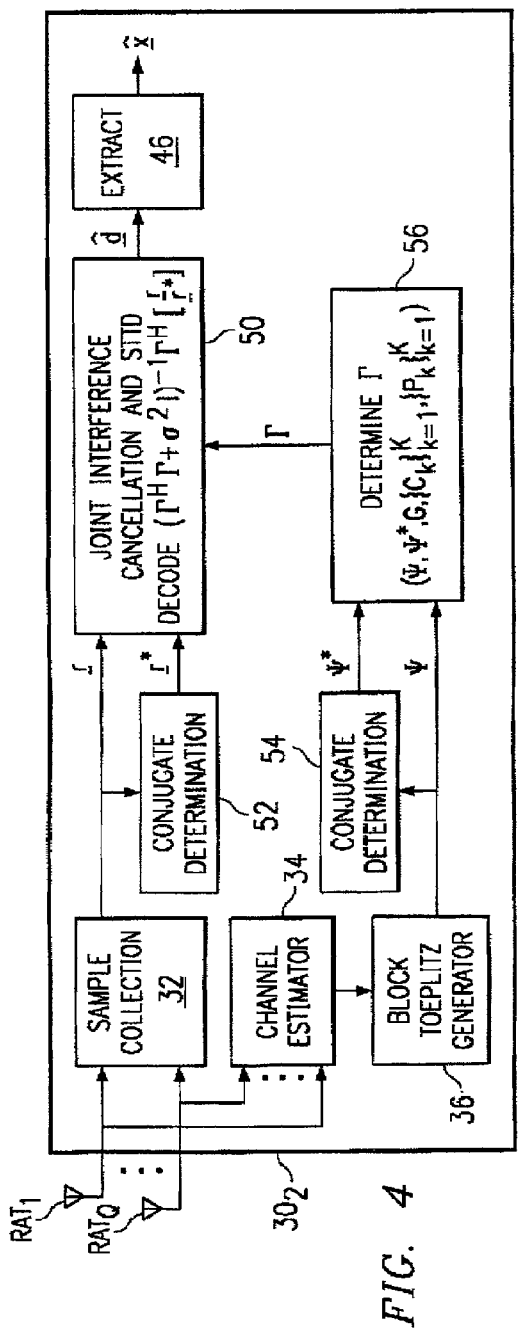
FIG. 4 illustrates an electrical and functional block diagram of a receiver for receiving multiple STTD CDMA signals and that employs a joint interference cancellation approach.

FIG. 4 illustrates an electrical and functional block diagram of a receiver $30_2$ for receiving multiple STTD CDMA signals from a single transmitter, where receiver $30_2$ represents the example introduced above that employs a joint interference cancellation approach. Receiver $30_2$ includes various of the same items as receiver $30_1$ shown in FIG. 3 and discussed above, where such items in FIG. 4 use the same reference numbers and the reader is referred to the earlier discussion for additional details relating to those items. Briefly, therefore, receiver $30_2$ includes a number Q of receive antennas $RAT_1$ through $RAT_Q$ which are connected to a sample collection block 32 that produces a block of received signal samples r, and receive antennas $RAT_1$ through $RAT_Q$ also provide pilot symbols to a channel estimator 34 that determines channel estimate values of $H_0$, $H_1$, through $H_L$. Channel estimator 34 outputs its channel estimates $H_0$, $H_1$, through $H_L$ to a block Toeplitz generator 36 that develops those values into the form of $\Psi$.

The value r output from sample collection block 32 is connected to a joint interference cancellation and STTD decode block 50. Before detailing the functionality of block 50, however, a greater understanding is provided with respect to other of its inputs as well as various signal relationships, as are explored immediately below.

The value r output from sample collection block 32 is also connected to a conjugate determination block 52. Conjugate determination block 52 operates to provide at its output the complex conjugate of its input; in receiver $30_2$, therefore, conjugate determination block 52 receives the value r and outputs the value r *. This output is connected as an input to joint interference cancellation and STTD decode block 50.

The value $\Psi$ from block Toeplitz generator 36 is connected to a conjugate determination block 54 and also to a determination block 56 that determines a value designated $\Gamma$. Conjugate determination block 54 operates to provide at its output the complex conjugate of its input; in receiver $30_2$, therefore, conjugate determination block 54 receives the value $\Psi$ and outputs the value $\Psi^*$. These conjugate value, $\Psi^*$, is also connected as an input to determination block 56.

By way of introduction to the operation of determination block 56, various signal manipulations are now demonstrated mathematically and with reference to some of the earlier-described analysis. Recall that receiver $30_1$ of FIG. 3 estimates $d_k$ having received r; in contrast, and in connection with the operation of determination block 56, receiver $30_2$ not only operates with respect to r, but it also operates with respect to the conjugate of r, that is, it operates with respect to r * as provided from conjugate determination block 52. This operation is now justified mathematically. First, since the spreading codes imposed by spreaders $24_{1,x}$ and $24_{2,x}$ are orthogonal with respect to one another, then the following Equation 34 may be stated:

$$C_{k'}^H C_k = \begin{bmatrix} (\underline{c}_{k'}^H(0) \otimes I_P)(\underline{c}_k(0) \otimes I_P) & 0 & 0 & 0 \\ 0 & (\underline{c}_{k'}^H(1) \otimes I_P)(\underline{c}_k(1) \otimes I_P) & 0 & 0 \\ 0 & 0 & \ddots & 0 \\ 0 & 0 & 0 & (\underline{c}_{k'}^H(N-1) \otimes I_P)(\underline{c}_k(N-1) \otimes I_P) \end{bmatrix} \quad \text{Equation 34}$$

In Equation 34, the designation of an apostrophe on the subscript k indicates, as known in the art, that 'k can be a different value than k'.

By applying the Kronecker identity from Equation 14 to Equation 34, the following Equation 35 results:

$$C_{k'}^H C_k = \begin{bmatrix} (\underline{c}_{k'}^H(0)\underline{c}_k(0)) \otimes I_P & 0 & 0 & 0 \\ 0 & (\underline{c}_{k'}^H(1)\underline{c}_k(1)) \otimes I_P & 0 & 0 \\ 0 & 0 & \ddots & 0 \\ 0 & 0 & 0 & (\underline{c}_{k'}^H(N-1)\underline{c}_k(N-1)) \otimes I_P \end{bmatrix} \quad \text{Equation 35}$$

Equation 35 may be re-written as a product involving an identity matrix as shown in the following Equation 36:

$$C_{k'}^H C_k = \begin{bmatrix} (\underline{c}_{k'}^H(0)\underline{c}_k(0)) & 0 & 0 & 0 \\ 0 & (\underline{c}_{k'}^H(1)\underline{c}_k(1)) & 0 & 0 \\ 0 & 0 & \ddots & 0 \\ 0 & 0 & 0 & (\underline{c}_{k'}^H(N-1)\underline{c}_k(N-1)) \end{bmatrix} \otimes I_P \quad \text{Equation 36}$$

Accordingly, from Equation 36, it may be seen that $C_k$ is unitary and $C_{k'}^H C_k = 0$ when k'≠k.

Given the above attributes, it also is observed that the expression in the following Equation 37 is semi-unitary, where such an observation is useful as discussed later.

$$C_k\left(I_{\frac{N}{2}} \otimes G\right) \quad \text{Equation 37}$$

As introduced above with respect to determination block 56, in the preferred embodiment it is desirable for receiver $30_2$ to extract the symbols from the transmitted signals by looking to the complex conjugate, r *, of the received value r. From the preceding Equations and observations and particularly using derivations based on Equation 27, that complex conjugate may be stated according to the following Equation 38:

$$r^* = \Psi^* \sum_{k=1}^{K} \sqrt{p_k}\, C_k^*\left(I_{\frac{N}{2}} \otimes G\right)\left(I_N \otimes \begin{bmatrix} 0 & I_2 \\ I_2 & 0 \end{bmatrix}\right) d_k + \eta^* \quad \text{Equation 38}$$

The above demonstrates that expressions can be developed for multipaths received by a CDMA receiver in a value r as well as its conjugate r *. These expressions, shown in Equations 27 and 38, may be combined in a vector in terms of both r and r *, as shown in the following Equation 39:

$$\begin{bmatrix} r \\ r^* \end{bmatrix} = \sum_{k=1}^{K} \sqrt{p_k} \begin{bmatrix} \Psi C_k\left(I_{\frac{N}{2}} \otimes G\right) \\ \Psi^* C_k\left(I_{\frac{N}{2}} \otimes G\right)\left(I_N \otimes \begin{bmatrix} 0 & I_2 \\ I_2 & 0 \end{bmatrix}\right) \end{bmatrix} d_k + \eta \quad \text{Equation 39}$$

From the expressions in Equation 39, one skilled in the art may now appreciate the operation of determination block 56. To facilitate this understanding, let the value $\Gamma_k$ be defined to equal the multiplicands of Equation 39 shown in the following Equation 40:

$$\Gamma_k = \begin{bmatrix} \Psi C_k\left(I_{\frac{N}{2}} \otimes G\right) \\ \Psi^* C_k\left(I_{\frac{N}{2}} \otimes G\right)\left(I_N \otimes \begin{bmatrix} 0 & I_2 \\ I_2 & 0 \end{bmatrix}\right) \end{bmatrix} \quad \text{Equation 40}$$

In Equation 40, $\Gamma_k$ has the dimensions 2N(SF)Q×NP.

From Equation 40, Equation 39 may be stated in the less complex form of the following Equation 41:

$$\begin{bmatrix} r \\ r^* \end{bmatrix} = \sum_{k=1}^{K} \sqrt{p_k}\, \Gamma_k d_k + \eta \quad \text{Equation 41}$$

Moreover, Equation 41 may be written out for all values of K, as shown in the following Equation 42:

$$\begin{bmatrix} r \\ r^* \end{bmatrix} = \begin{bmatrix} \sqrt{p_1}\, \Gamma_1 & \sqrt{p_2}\, \Gamma_2 & \ldots & \sqrt{p_K}\, \Gamma_K \end{bmatrix} \begin{bmatrix} d_1 \\ d_2 \\ \vdots \\ d_K \end{bmatrix} + \eta \quad \text{Equation 42}$$

Next, let the two multiplicands of Equation 42 be represented by the following designations in Equations 43 and 44:

$$\Gamma = \begin{bmatrix} \sqrt{p_1}\, \Gamma_1 & \sqrt{p_2}\, \Gamma_2 & \ldots & \sqrt{p_K}\, \Gamma_K \end{bmatrix} \quad \text{Equation 43}$$

where, $\Gamma$ has the dimensions $2N(SF)Q \times NPK$.

$$d = \begin{bmatrix} d_1 \\ d_2 \\ \vdots \\ d_K \end{bmatrix}$$

Equation 44

Finally, therefore, from Equations 43 and 44, Equation 42 may be stated in the simple form of the following Equation 45:

$$\begin{bmatrix} r \\ r^* \end{bmatrix} = \Gamma \underline{d} + \eta$$

Equation 45

From the simplified form of Equation 45, it may be seen that d may be estimated given both r and r* and by removing the effects imposed by $\Gamma$ (and also by ignoring the effects of noise, $\eta$). Joint interference cancellation and STTD decode block 50 operates toward this end, and in doing so it therefore implements a joint equalization aspect. Recall from the discussion of receiver 30₁ that the preferred embodiments contemplate lack of orthogonality due to multipath interference, even though the transmitted signals are orthogonal at the time of transmission; in this regard, the interference cancellation aspect of block 50 serves to suppress the interference effects caused by multipaths in receiver 30₂. This joint equalization aspect is preferably performed also using one of various different techniques, such as those that were implemented with respect to MIMO equalizer 40 of receiver 30₁, although that equalization was directed only to $\Psi$ whereas the joint operation of block 40 is directed to $\Gamma$. Thus, these techniques include (i) zero forcing or MMSE; (ii) 1-shot (i.e., linear) or iterative; (iii) 1-stage or multistage; and (iv) maximum likelihood detection. Again, certain of these techniques also may be combined, as is known, such as with a linear MMSE, an iterative MMSE, a linear zero forcing, and an iterative zero forcing. By way of an example wherein block 50 implements an iterative MMSE approach, such an approach therefore gives rise to the following Equation 46:

$$\hat{\underline{d}} = (\Gamma^H \Gamma + \sigma^2 I)^{-1} \Gamma^H \begin{bmatrix} r \\ r^* \end{bmatrix}$$

Equation 46

Having demonstrated the various signal relationships above, attention is now returned to the operation of determination block 56, which recall from above is stated to determine the value $\Gamma$. From the preceding, one skilled in the art will now appreciate the various factors used to determine $\Gamma$, including $\Psi$, $\Psi^*$, , G, $\{C_k\}_{k=1}^K$, and $\{p_k\}_{k=1}^K$. Additionally, once $\Gamma$ is determined by block 56, then block 56 outputs that value to joint interference cancellation and STTD decode block 50. In response, and also because block 50 receives r and r* as shown in FIG. 4 and described earlier, then block 56 solves for $\hat{d}$ given these values, as appreciated from Equation 46. Block 50 then outputs $\hat{d}$ to an extract block 46. For receiver 30₂, extract block 46 functions in the same manner as described earlier with respect to receiver 30₁ and, thus, the reader is referred to the earlier discussion of that functionality.

From the above, various observations may be made with respect to the example receiver 30₂ of FIG. 4, including certain advantages it provides. First, in terms of error rate, receiver 30₂ is likely to perform better than receiver 30₁. However, additional information is needed by receiver 30₂ so as to achieve these results. For example, rather than requiring knowledge of the single code (or multicode) corresponding to the given receiver, instead receiver 30₂ must be informed of $\{C_k\}_{k=1}^K$, and it also must be informed of all power factors $\{p_k\}_{k=1}^K$. Also, for the implementation of receiver 30₂, note that the number or receive antennas Q should meet the requirement of the following Equation 47:

$$Q \geq \frac{PK}{2(SF)}$$

Equation 47

This aspect is similar to the earlier conclusion with respect to receiver 30₁ based on the dimensions of matrix $\Psi$, but with respect to receiver 30₂ a comparable analysis can be made with respect to the dimension of $\Gamma$, which recall has dimensions of $2N(SF)Q \times NPK$. Thus, for receiver 30₂ to perform at a desirable level so as to reliably separate and estimate all NP symbols, then essentially it is solving for unknown values given a number of known values (i.e., received value), which in a matrix sense is realized in that the columns of the matrix $\Gamma$ represent the known values whereas the rows represent the equations from which the unknowns may be determined. Accordingly, in the case of the dimensions of the matrix $\Gamma$, it is desirable that $2N(SF)Q \geq NPK$. By re-writing tis relationship in terms solely of Q, the previous Equation 47 is realized, thereby reflecting the above observation with respect to the desirable number of receive antennas Q.

Figure 5:
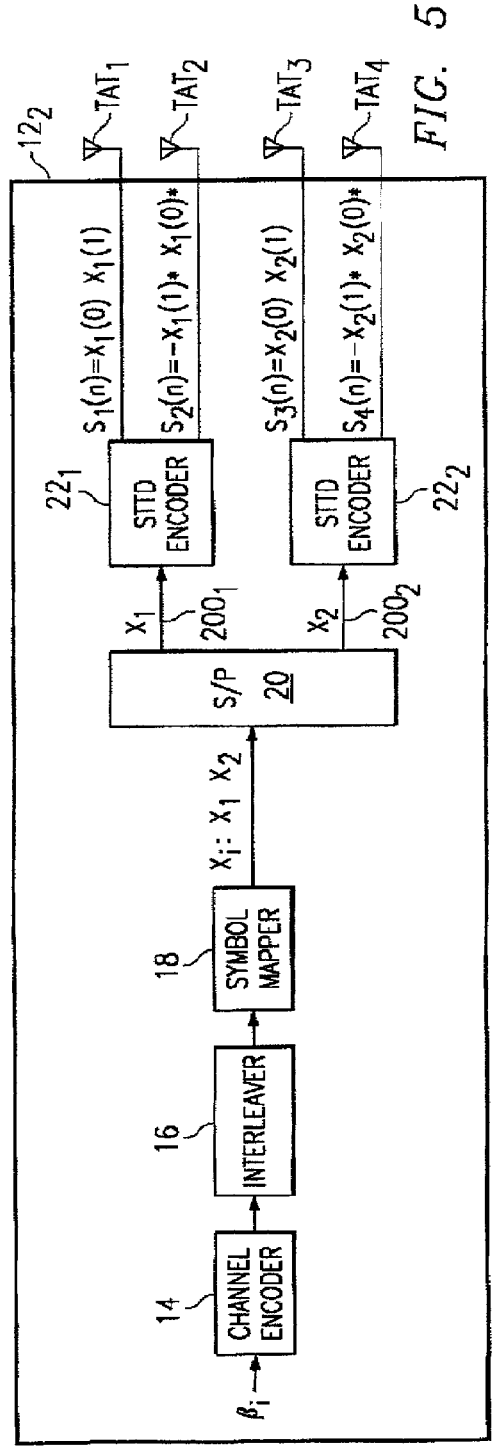
FIG. 5 illustrates an electrical and functional block diagram of a first transmitter that operates to transmit a multiple STTD encoded signal in a TDMA format.

FIG. 5 illustrates an electrical and functional block diagram of an alternative embodiment transmitter 12₂ which again may be used for either or both of base stations BST1 and BST2 in FIG. 1. Transmitter 12₂ may be constructed generally in the same manner as transmitter 12₁ of FIG. 2, with the exception that transmitter 12₂ is intended to transmit its signals in a TDMA format and, thus, no spreading functionality is included in transmitter 12₂. Instead, as known in the TDMA format, different users are multiplexed in time. Thus, for the sake of representing the output signals for processing by the receiver detailed below, those signals use the same designation as the signals in transmitter 12₁ before spreading, that is, in the form of s(n) as shown in Equation 2.

Having described transmitter 12₂, one skilled in the art should appreciate from the earlier discussion of other embodiments that the signal processing by a receiver receiving signals from transmitter 12₂ is comparable in many respects to that described earlier with respect to receivers 30₁ and 30₂. In other words, a set of signals may be received, each possibly including multipaths from the transmitter, and those signals may be processed in various fashions. As in the cases described above for CDMA communications, in the preferred embodiments directed to TDMA communications the same two different receiver techniques described above are modified and used for receiving TDMA signals, that is, a first receiver technique employs a MIMO equalization followed by STTD decoding, and a second receiver technique employs a joint interference cancellation approach. Each of these techniques is detailed below.

Figure 6:
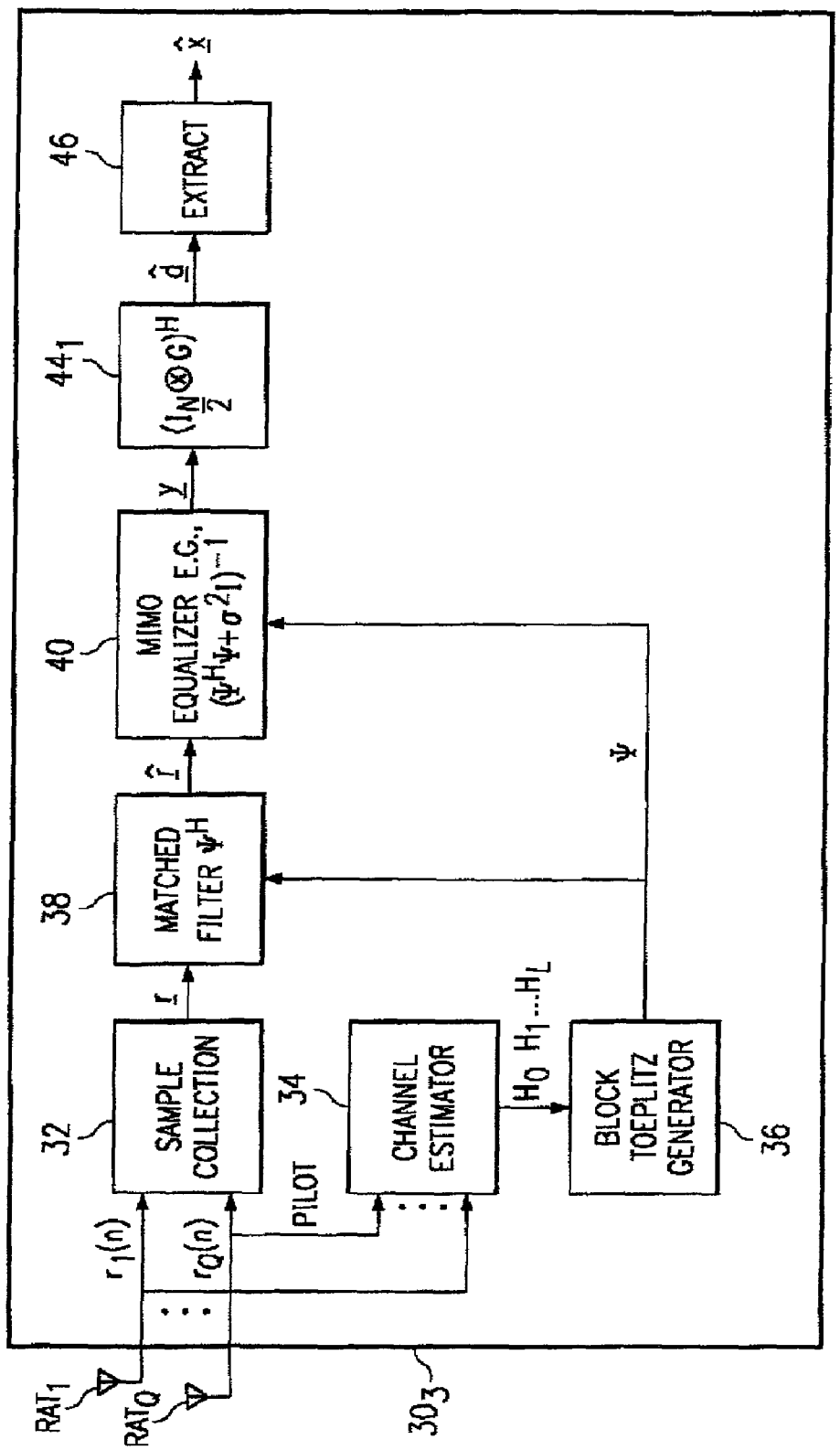
FIG. 6 illustrates an electrical and functional block diagram of a receiver for receiving multiple STTD TDMA signals and implementing a MIMO equalization followed by STTD decoding.

FIG. 6 illustrates an electrical and functional block diagram of a receiver 30₃ for receiving multiple STTD TDMA signals from transmitter $12_2$ of FIG. 5 and for implementing a MIMO equalization followed by STTD decoding. A detailed discussion of each of the blocks of receiver $30_3$, however, is not provided here as one skilled in the art should readily appreciate that the blocks of receiver $30_3$ are the same as those of receiver $30_1$, with the exception that receiver $30_3$ does not include despreaders $42_1$ through $42_K$; such a deletion should be readily understood because receiver $30_3$ receives TDMA communications and, hence, there is no code spreading in the transmitted signals that requires a corresponding despreading in the received signals.

The operation of receiver $30_3$ is also considerably comparable to that of receiver $30_1$ addressed above, but once more the same notion that despreading is not required also explains the differences in operation of receiver $30_3$ as compared to receiver $30_1$. First, because CDMA transmissions involve a chip-rate spreading of the transmitted signal, then the above-described CDMA receivers sampled at the chip (or sub-chip) rate; in contrast, the TDMA receiver $30_3$ preferably samples at the symbol rate and as is described in the following example, although sampling at a sub-symbol rate could be implemented. Second, the distinction of TDMA and CDMA is perhaps more readily appreciated mathematically. Further in this regard, the mathematics are also comparable to those described earlier with respect to receivers $30_1$ and $30_2$, where here relative to receiver $30_3$ (and receiver $30_4$, below) the notion of codes is removed from the Equations due to the implementation of TDMA rather than CDMA. In this regard, various of the previous analyses hold true although as already stated in TDMA there is no notion of codes; thus, Equation 27 may be rewritten without the multiplicand relating to codes to define the relationship between the received value of r and the originally-transmitted symbols included in the vector $d_k$. Further, since a TDMA can examine a single in time corresponding to a single user, then there also is no concern, or summation, over a total of K codes; accordingly, the TDMA relationship is as shown in the following Equation 48:

$$\underline{r} = \Psi \sqrt{p} \left( I_{\frac{N}{2}} \otimes G \right) \underline{d} + \eta \qquad \text{Equation 48}$$

Further, in Equation 48, the matrix $\Psi$ has dimensions NQ×NP, because there is no notion of the spreading factor SF in TDMA. Accordingly, for receiver $30_3$, the operation of blocks 32, 34, 36, 38, and 40 (assuming again an example of iterative MMSE) are comparable as described above for receiver $30_1$, thereby producing y as described earlier in Equation 30. Further, from y, no despreading is required and, hence, that signal is connected directly to STTD decoder $44_1$; further, there no notion of STTD decoders $44_2$ through $44_K$ since, in TDMA, there is no notion of the K codes. Accordingly, STTD decoder 441 operates in the same manner as described earlier with respect to STTD decoders $44_1$ through $44_K$ and, hence, it removes the effect of $$\left( I_{\frac{N}{2}} \otimes G \right)$$

and thereby produces the data symbol estimate shown in FIG. 6 as $\hat{d}$, and that estimate is connected to an extract block 46. Extract block 46 operates as described earlier and thereby operates to recover $\hat{x}$.

From the above, various observations may be made with respect to the example receiver $30_3$ of FIG. 6, including certain advantages it provides. First, receiver $30_3$ receives at multiple receive antennas an STTD TDMA signal from a transmitter with multiple transmit antennas and that will include multipaths, and receiver $30_3$ operates to satisfactorily detect the symbols transmitted in those signals. Also, for the implementation of receiver $30_3$, note that like the MIMO equalization based receiver $30_1$ described earlier, receiver $30_3$ also is such that the number of receive antennas Q should equal or exceed the number of transmit antennas P.

Figure 7:
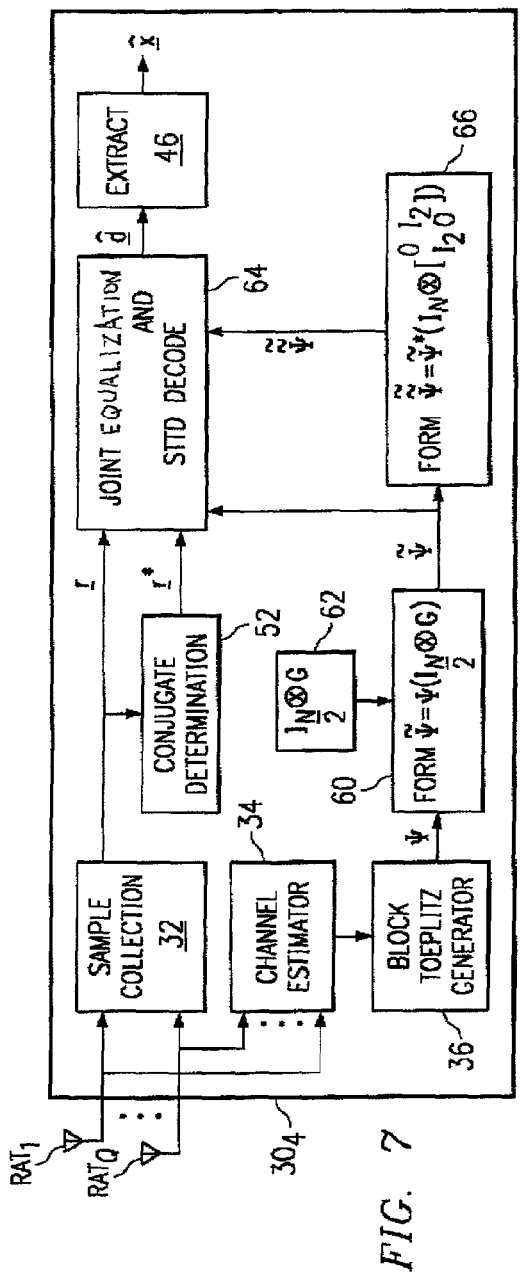
FIG. 7 illustrates an electrical and functional block diagram of a receiver for receiving multiple STTD TDMA signals and implementing a joint interference cancellation approach.

FIG. 7 illustrates an electrical and functional block diagram of a receiver $30_4$ for receiving multiple STTD TDMA signals from transmitter $12_2$ of FIG. 5 and for implementing a joint interference cancellation approach. A detailed discussion of some of the blocks of receiver $30_4$, however, is not provided here with respect to those blocks that are the same as in receiver $30_2$ of FIG. 4 (i.e., directed to a joint interference cancellation approach for CDMA). Thus, the following discussion instead focuses on those blocks of FIG. 7 that differ from previous embodiments.

Inasmuch as receiver $30_4$ implements a joint approach relative to an STTD signal, it is therefore desirable for receiver $30_4$ to extract the data symbols from the transmitted signals by looking to the complex conjugate, r *, of the received value r. Thus, in a comparable manner to the derivation of Equation 38 as earlier discussed with respect to STTD CDMA, the following Equation 49 may be written in the case of STTD TDMA, once more removing the aspect of any codes as in a manner comparable to the derivation of Equation 48 from Equation 27:

$$\underline{r}^* = \Psi^* \sqrt{p} \left( I_{\frac{N}{2}} \otimes G \right) \left( I_N \otimes \begin{bmatrix} 0 & I_2 \\ I_2 & 0 \end{bmatrix} \right) \underline{d} + \eta \qquad \text{Equation 49}$$

Thus, Equations 48 and 49 establish the relationship between the received value r and its conjugate r * relative to the symbol data $d_k$. Thus, the relationships of Equations 48 and 49 may be stacked in matrix fashion as shown in the following Equation 50:

$$\begin{bmatrix} \underline{r} \\ \underline{r}^* \end{bmatrix} = \begin{bmatrix} \Psi \left( I_{\frac{N}{2}} \otimes G \right) \\ \Psi^* \left( I_{\frac{N}{2}} \otimes G \right) \left( I_N \otimes \begin{bmatrix} 0 & I_2 \\ I_2 & 0 \end{bmatrix} \right) \end{bmatrix} \underline{d} \qquad \text{Equation 50}$$

The relationships of Equation 50 are therefore exploited by receiver $30_4$ to produce estimates of the symbol data, as shown below.

Returning to FIG. 7, the $\Psi$ output of block Toeplitz generator 36 is connected to a product formation block 60 that determines the upper element of the matrix shown in Equation 51. For the sake of illustration in FIG. 7, this value is designated $\tilde{\Psi}$ and is determined also with the value $$\left( I_{\frac{N}{2}} \otimes G \right)$$

provided from factor block 62. The value $\tilde{\Psi}$ is output to a joint equalization and STTD decode block 64 and, in addition, the value $\tilde{\Psi}$ is also input to an additional product formation block 66. Block 66 determines the lower element of the matrix shown in Equation 50 which, for the sake of illustration in FIG. 7, is designated $\check{\Psi}$. The resultant value $\check{\Psi}$ is also output to joint equalization and STTD decode block 64.

From the preceding, one skilled in the art will appreciate that joint equalization and STTD decode block 64, having received the values $\hat{\Psi}$ and $\check{\Psi}$ thereby representing the matrix that is multiplied times d in Equation 51, may readily estimate d using any of the techniques described above (e.g., zero forcing or MMSE; 1-shot (i.e., linear) or iterative; 1-stage or multistage; maximum likelihood detection, and so forth). In this regard, the equalization aspect of block 64 serves to suppress the interference effects caused by multi-paths in receiver 30$_3$. In any event, from whatever of the optional techniques are implemented, the estimate, designated $\hat{d}$, is output to extract block 46 which operates in the same manner as described earlier with respect to other embodiments. In any event, therefore, the number or receive antennas Q should meet the requirement of the following Equation 51, where the reasoning for this requirement is the comparable to that stated earlier with respect to the antenna requirements of previous embodiments:

$$Q \geq \frac{P}{2} \quad \text{Equation 51}$$

Accordingly, it may operate with half of the number of antennas required of receiver 30$_3$ described above in connection with FIG. 6.

Figure 8:
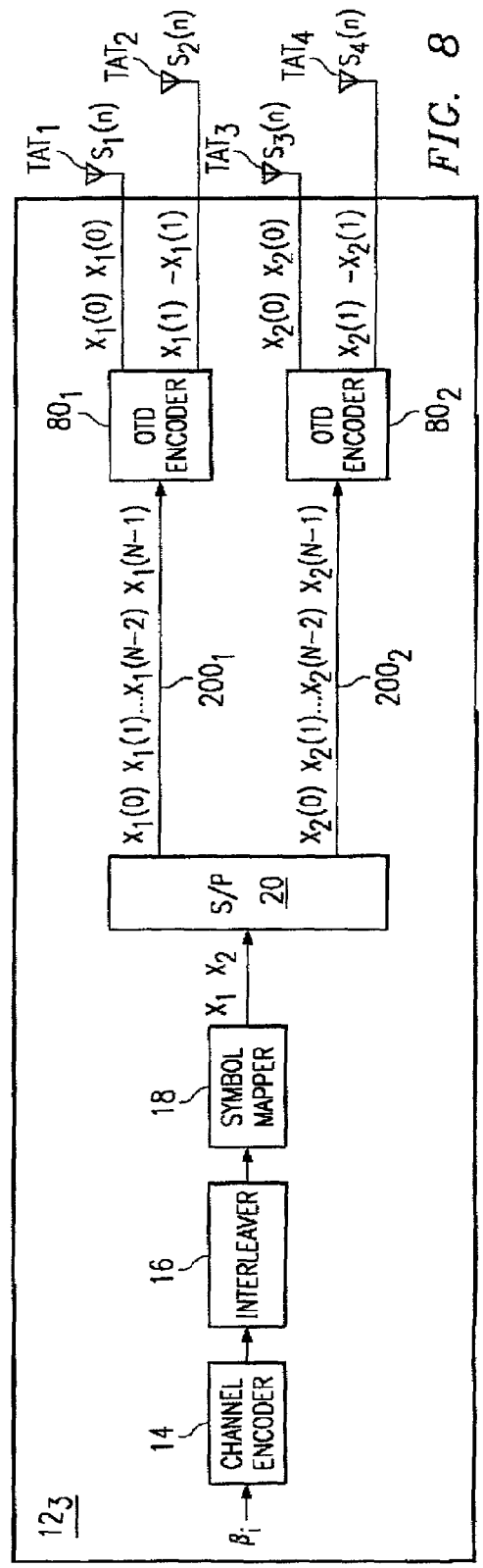
FIG. 8 illustrates an electrical and functional block diagram of a transmitter that operates to transmit a multiple OTD encoded signal in a TDMA format.

FIG. 8 illustrates an electrical and functional block diagram of another transmitter 12$_3$ according to the preferred embodiment and that also may be used for either or both of base stations BST1 and BST2 in FIG. 1. In various respects, transmitter 12$_3$ may be implemented using some of the same certain blocks as used in transmitter 12$_1$ of FIG. 2 and, thus, like reference numbers are used for these blocks in FIGS. 2 and 8. These mutual blocks are not discussed once again in detail and, instead, the reader is referred to the earlier discussion of FIG. 2. Further, as to these blocks as well as the remaining blocks in FIG. 8, the actual implementation of each such block may be achieved according to principles known in the art, while such known aspects are improved as a whole due to advancements in the construction and operation of the preferred embodiment as relating to multiple space time encoding. In general and as detailed below, transmitter 12$_3$ operates to transmit a multiple OTD encoded signal in a TDMA format to a receiver such as a receiver in user station UST of FIG. 1.

Transmitter 12$_3$ generally includes a same channel encoder 14, interleaver 16, symbol mapper 18, and serial-to-parallel converter 20 of transmitter 12$_1$ and, thus, the following discussion instead focuses on the remaining blocks illustrated in FIG. 8. Recalling that symbol mapper 18 converts its input bits to symbols, designated generally as $x_i$, and outputs them to serial-to-parallel converter 20, for sake of later reference two such symbols $x_1$ and $x_2$ are shown in FIG. 8. As earlier for transmitter 12$_1$, in the preferred embodiment, serial-to-parallel converter 20 has a number of outputs equal to the number of encoders for transmitter 12$_3$. In the present example, transmitter 12$_3$ includes two OTD encoders 80$_1$ and 80$_2$ which may correspond to the P antennas AT1$_x$ in FIG. 1. Returning to serial-to-parallel converter 20, it therefore has two outputs 20o$_1$ and 20o$_2$ that connect to the two transmit antennas TAT$_1$ and TAT$_2$, respectively As earlier, in response to its inputs, serial-to-parallel converter 20 receives the incoming symbol samples and outputs them in parallel streams along its outputs 20o$_1$ and 20o$_2$ by outputting every other of its inputs along every other of its outputs.

Each stream output from serial-to-parallel converter 20 is connected to a corresponding OTD encoder 80$_1$ and 80$_1$. Each OTD encoder 80$_1$ and 80$_2$ operates individually as known in the art; however, note that the inclusion of more than one such OTD encoder renders transmitter 12$_3$ as a multiple (i.e., more than one) OTD approach. The use of multiple OTD encoders permits a first stream of symbols to be input to, and encoded by, OTD encoder 80$_1$, while a second stream of symbols, independent from the first stream of symbols, is input to, and encoded by, OTD encoder 80$_2$. As a result, overall data transmission rate is doubled versus that of a single OTD approach. Looking now to the specific operation performed by each OTD encoder 80$_1$ and 80$_2$, each such encoder operates in a comparable manner and, thus, encoder 80$_1$ is described by way of example. Encoder 80$_1$ first buffers a number of symbol samples equal to the number of transmit antennas to which it is coupled. In the example of FIG. 8, encoder 80$_1$ is coupled to two transmit antennas TAT$_1$ and TAT$_2$, so OTD encoder 80$_1$ therefore buffers two symbol samples (e.g., $x_1(1)$ and $x_1(2)$). Next, OTD encoder 80$_1$ directly outputs the first buffered symbol twice along antenna TAT$_1$ and, thus, symbol sample $x_1(1)$ is output for transmission at a time $t_1$ and also at a time $t_2$ (let these symbols be represented as $s_1(n)$). During the same two time periods, however, and for transmission along antenna TAT$_2$, OTD encoder 80$_1$ outputs the second of the two buffered symbol samples, $x_1(2)$, at time $t_1$ and the negative of that same second sample at time $t_2$, that is, it outputs $-x_1(2)$ in the present example at $t_2$ (let these symbols be represented as $s_2(n)$). From the symbol samples transmitted by OTD encoder 80$_1$, a compatible receiver is therefore able to resolve the symbols in a manner that often yields favorable data error rates even given relatively large Doppler rates. Lastly, one skilled in the art should recognize that OTD encoder 80$_2$ operates in a manner comparable to OTD encoder 80$_1$; thus, OTD encoder 80$_2$ outputs to transmit antenna TAT$_3$ a sequence $s_3(n)$ including $x_2(1)$ at $t_1$ and $x_2(1)$ at $t_2$, and OTD encoder 80$_2$ outputs to transmit antenna TAT$_4$ a sequence $s_4(n)$ including $x_2(2)$ at time $t_1$ and $-x_2(2)$ at time $t_2$.

Having described transmitter 12$_3$, once more one skilled in the art should appreciate from the earlier discussion of other embodiments that the signal processing by a receiver receiving signals from transmitter 12$_3$ is comparable in many respects to that described earlier with respect to the various above-discussed receivers. Thus, a set of signals is received, each likely including multipaths from the transmitter, and those signals may be processed in various fashions. As in the STTD case described above for TDMA communications, in the preferred embodiments a receiver operating in response to communications from the TDMA OTD transmitter 12$_3$ of FIG. 8 may be implemented using the same two different receiver techniques described above with appropriate modifications for receiving TDMA OTD signals; thus, a first receiver technique employs a MIMO equalization followed by OTD decoding, and a second receiver technique employs a joint interference cancellation approach. Each of these techniques is detailed below.

Figure 9:
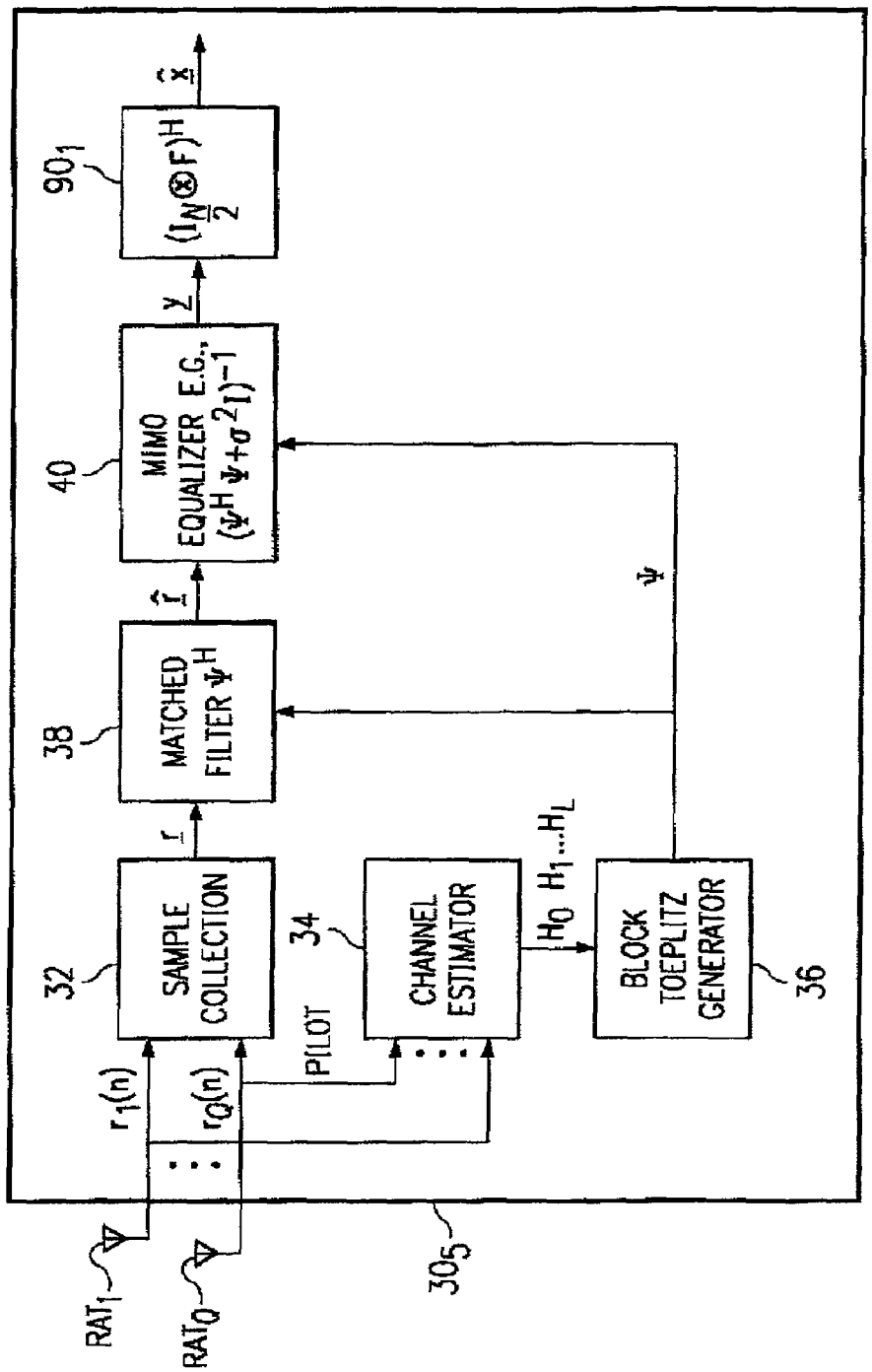
FIG. 9 illustrates an electrical and functional block diagram of a receiver for receiving multiple OTD TDMA signals from and implementing MIMO equalization followed by OTD decoding.

FIG. 9 illustrates an electrical and functional block diagram of a receiver 30$_5$ for receiving multiple OTD TDMA signals from transmitter 12$_3$ of FIG. 8 and for implementing a MIMO equalization followed by OTD decoding. A detailed discussion of most of the blocks of receiver $30_5$, however, is not provided here as one skilled in the art should readily appreciate that most of the blocks of receiver $30_5$ are the same as those of receiver $30_3$, with the exception that receiver $30_5$ is directed to decode multiple OTD transmissions while receiver $30_3$ is directed to decode multiple STTD transmissions. Thus, receiver $30_5$ differs from receiver $30_3$ only in that the former includes an OTD decoder $90_1$ as opposed to STTD decoder $44_1$ through $44_K$ as in the case of receiver $30_5$. An understanding of the operation of OTD decoder $90_1$ is developed below.

To appreciate the operation of OTD decoder $90_1$, attention is directed to the signals received by receiver $30_5$ from transmitter $12_3$, that is, an examination is made of the transmitted signals so as to appreciate them in their received form. First, the transmitted signals from transmitter $12_3$ are represented in terms of x(n), rather than in terms of u(n), because there is no sense of transmitted complex conjugates in an OTD system. Thus, the relationship of Equation 1 above also holds true for transmitter $12_3$ and receiver $30_5$, that is, at a given time (n) a vector x(n) may be described as the symbol samples communicated to the encoders, where in the present case that is to encoders $80_1$ and $80_2$; thus, Equation 1 is repeated here for the convenience of the reader:

$$\underline{x}(n) = \begin{bmatrix} x_1(n) \\ x_2(n) \end{bmatrix} \qquad \text{Equation 1}$$

Additionally, for a collection of N samples at different times (n), then a vector x may be defined with respect to the vector x(n) of Equation 1 at different times, as shown in the following Equation 52:

$$\underline{x} = \begin{bmatrix} \underline{x}(0) \\ \underline{x}(1) \\ \vdots \\ \underline{x}(N-1) \end{bmatrix} \qquad \text{Equation 52}$$

Next, instead of d(n) as in the multiple STTD case where complex conjugates are used, in the present OTD embodiment a relationship between s, which is a vector of dimension NP×1, and x, may be stated, as set forth in the following Equation 53:

$$\underline{s} = \left(I_{\frac{N}{2}} \otimes F\right)\underline{x} \qquad \text{Equation 53}$$

In Equation 53, $$I_{\frac{N}{2}}$$

is an identify matrix of dimension N/2, F is a matrix with fixed values having a dimension of 2P×P, and the Kronecker product $$\left(I_{\frac{N}{2}} \otimes F\right)$$

is semi-unitary because, as shown below, F is not a square matrix. Moreover, because $$\left(I_{\frac{N}{2}} \otimes F\right)$$

is semi-unitary, the relationship shown in the following Equation 54 holds true:

$$\left(I_{\frac{N}{2}} \otimes F\right)^H \left(I_{\frac{N}{2}} \otimes F\right) = I_{2N} \qquad \text{Equation 54}$$

For the example of FIG. 8 wherein P=4, then with respect to s(0) and s(1), the matrix F of Equation 53 is as shown in the following Equation 55:

$$\begin{bmatrix} \underline{s}(0) \\ \underline{s}(1) \end{bmatrix} = \left( \begin{bmatrix} 1 & 0 & 0 & 0 \\ 0 & 0 & 1 & 0 \\ 0 & 1 & 0 & 0 \\ 0 & 0 & 0 & 1 \\ 1 & 0 & 0 & 0 \\ 0 & 0 & -1 & 0 \\ 0 & 1 & 0 & 0 \\ 0 & 0 & 0 & -1 \end{bmatrix} \right) \begin{bmatrix} x_1(0) \\ x_2(0) \\ x_1(1) \\ x_2(1) \end{bmatrix} \qquad \text{Equation 55}$$

Returning now to receiver $30_5$ of FIG. 9, the received signals $r_1(n)$ through $r_Q(n)$ may be stated as the vector r described earlier in Equation 7, and when multiple samples are collected by sample collection block 32, thereby including multipaths from each of the P transmit antennas to each of the Q receive antennas, that vector r may be stated as shown in the following equation 56:

$$r = \Psi s = w \qquad \text{Equation 56}$$

In Equation 56, s is as described above in connection with Equation 3, $\Psi$ is the block Toeplitz matrix as also described earlier with respect other embodiments and which, in the present embodiment, is a matrix of dimension NQ×NP, and w is noise.

Substituting Equation 53 into the value of s in Equation 56 yields the following Equation 57:

$$\underline{r} = \Psi\left(I_{\frac{N}{2}} \otimes F\right)\underline{x} + \underline{w} \qquad \text{Equation 57}$$

In Equation 57, r has dimensions NQ×1, $\Psi$ has dimensions NQ×NP, the product within parenthesis has dimensions NP×NP/2, and x has dimensions NP/2×1.

Given the value of r in Equation 57, in FIG. 9 matched filter 38 and MIMO equalizer 40 operate again as described above with respect to receiver $30_3$, where once more MIMO equalizer 40 may implement various different techniques. For instance, in the example implementation of linear MMSE, then MIMO equalizer 40 produces the value y, where comparably to earlier determination it may be seen that y is as shown in the following Equation 58:

$$\underline{y} = \left(I_{\frac{N}{2}} \otimes F\right)\underline{x} + \text{residual interference and noise} \quad \text{Equation 58}$$

From Equation 58, one skilled in the art may now appreciate also the operation of OTD decoders $90_1$ through $90_K$. Specifically, each such encoder operates to remove the effect of the term $$\left(I_{\frac{N}{2}} \otimes F\right)$$

in Equation 58, that is, they multiply the input times the Hermitian of this term, namely, by $$\left(I_{\frac{N}{2}} \otimes F\right)^H.$$

As a result, the remaining signal represents x.

From the above, various observations may be made with respect to the example receiver $30_5$ of FIG. 9, including certain advantages it provides. First, receiver $30_5$ receives at multiple receive antennas an OTD TDMA signal from a transmitter with multiple transmit antennas and that will include multipaths, and receiver $30_5$ operates using MIMO equalization followed by OTD decoding to satisfactorily detect the symbols transmitted in those signals. Also, for the implementation of receiver $30_5$, note that like the MIMO equalization based receivers $30_1$ and $30_3$ described earlier, receiver $30_5$ also is such that the number of receive antennas Q should equal or exceed the number of transmit antennas P.

Figure 10:
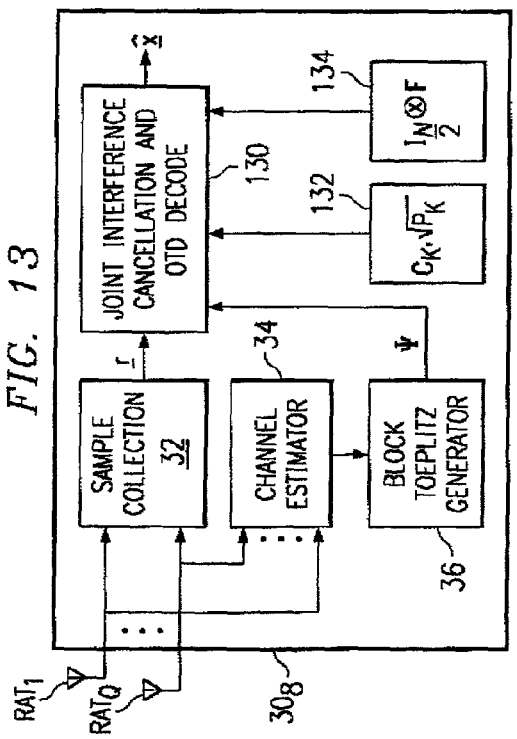
FIG. 10 illustrates an electrical and functional block diagram of a receiver for receiving multiple OTD TDMA and implementing a joint equalization and OTD decoding approach.

FIG. 10 illustrates an electrical and functional block diagram of a receiver $30_6$ for receiving multiple OTD TDMA signals from transmitter $12_3$ of FIG. 8 and for implementing a joint equalization and OTD decoding approach. Again, some of the blocks of receiver $30_6$ are comparable to earlier blocks and, thus, the reader is referred to the earlier discussion of those blocks for details. Looking then to the differences in receiver $30_6$, first note that even though it represents a joint approach, only the value r is connected from sample collection block 32 to a joint equalization and OTD decode block 100, that is, the conjugate value r * is not developed or provided to block 100. This aspect is preferred because in the present instance, wherein TDMA is combined with multiple OTD, x* is not used in the OTD encoding by transmitter $12_3$ so there is no inclusion of r * for the joint solution in receiver $30_6$. In addition, block Toeplitz generator 36 generates the value Ψ as described with respect to earlier embodiments, and it outputs it to joint equalization and OTD decode block 100. The equalization aspect of block 100 serves to suppress the interference effects caused by multipaths in receiver $30_4$, namely, it determines an estimate of x as is now described. Specifically, for the sake of appreciating the joint operation, let the value Π be defined in relation to the terms taken from Equation 57 as shown in the following Equation 59:

$$\Pi = \Psi\left(I_{\frac{N}{2}} \otimes F\right) \quad \text{Equation 59}$$

Next, by substituting the value of Π from Equation 59 into Equation 57, a simplified expression for r is produced as shown in the following Equation 60:

$$r = \Pi x + w \quad \text{Equation 60}$$

From the form of Equation 60, block 100 may solve for an estimate of x again using the various approaches mentioned with respect to earlier embodiments, including zero forcing or MMSE, 1-shot (i.e., linear) or iterative, 1-stage or multistage, maximum likelihood detection, or a combination thereof. By way of example, assume that block 100 performs a linear MMSE. Accordingly, from Equation 60 an estimate of x may be realized according to the following Equation 61:

$$\hat{x} = (\Pi^H \Pi + \sigma^2 I)^{-1} \Pi^H r \quad \text{Equation 61}$$

Further, ignoring the noise element, w, then substituting the value of r from Equation 60 into Equation 61 yields the following Equation 62:

$$\hat{x} = (\Pi^H \Pi + \sigma^2 I)^{-1} \Pi^H \Pi x \quad \text{Equation 62}$$

Lastly, by substituting the value of Π from Equation 59 into Equation 61, then the following Equation 63 is produced:

$$\hat{x} = \left(\left(I_{\frac{N}{2}} \otimes F\right)^H \Psi^H \Psi \left(I_{\frac{N}{2}} \otimes F\right)^H + \sigma_2 I\right)^{-1} \left(I_{\frac{N}{2}} \otimes F\right)^H \Psi^H r \quad \text{Equation 63}$$

In view of Equation 63, block 100 receives Ψ from block Toeplitz generator 36, the value $$\left(I_{\frac{N}{2}} \otimes F\right)$$

from a factor block 104, and r from sample collection block 32; thus, from these values it may determine the estimated value $\hat{x}$ according to Equation 63.

From the above, various observations may be made with respect to the example receiver $30_6$ of FIG. 10, including certain advantages it provides. First, receiver $30_5$ receives at multiple receive antennas an OTD TDMA signal from a transmitter with multiple transmit antennas and that will include multipaths, and receiver $30_5$ operates to satisfactorily detect the symbols transmitted in those signals using a joint equalization and OTD decoding approach. Also, for reasons comparable to those expressed with respect to Equation 47, in the implementation of receiver $30_6$, note that the number or receive antennas Q should meet the requirement of the following Equation 64:

$$Q \geq \frac{P}{2} \quad \text{Equation 64}$$

Figure 11:
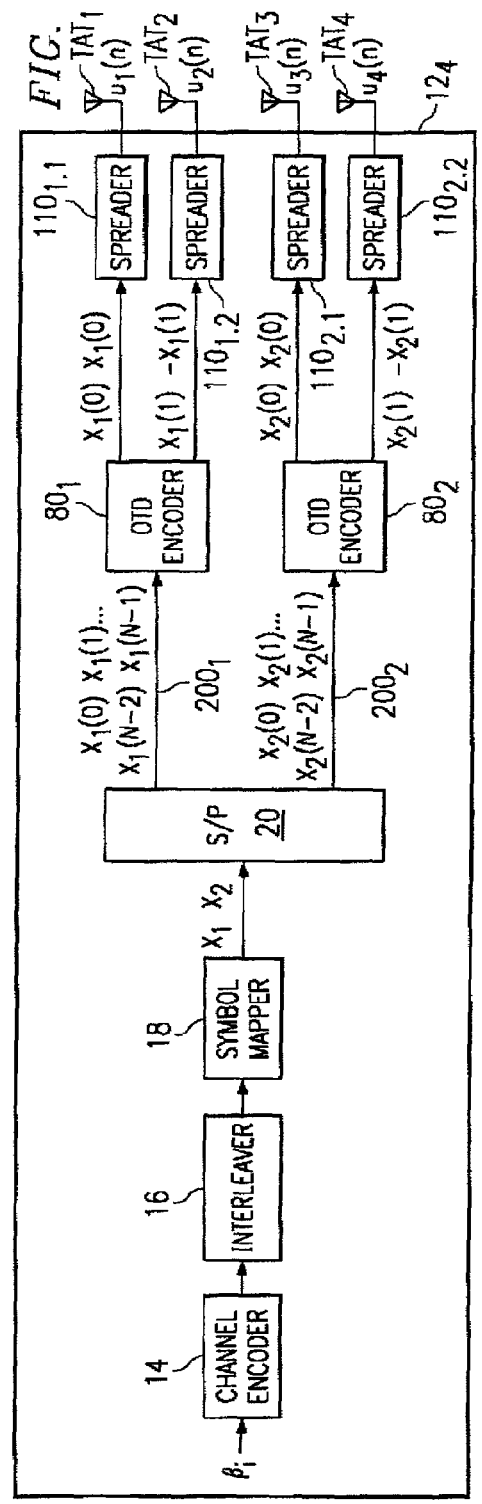
FIG. 11 illustrates an electrical and functional block diagram of a transmitter that operates to transmit a multiple OTD encoded signal in a CDMA format.

FIG. 11 illustrates an electrical and functional block diagram of another preferred embodiment transmitter $12_4$ and that also may be used for either or both of base stations BST1 and BST2 in FIG. 1, where transmitter $12_4$ operates to transmit a multiple OTD encoded signal in a CDMA format to a receiver such as a receiver in user station UST of FIG. 1. In various respects, transmitter $12_4$ may be implemented using some of the same blocks as used in transmitter $12_1$ of FIG. 2 and transmitter $12_3$ of FIG. 8, where like reference numbers are used for these blocks in FIGS. 2, 8, and 11. Further, these mutual blocks are not discussed once again in detail and, instead, the reader is referred to the earlier discussion of FIGS. 2 and 8.

Transmitter $12_4$ generally includes the same blocks as transmitter $12_3$ of FIG. 8, and it further includes spreaders connected to the outputs of OTD encoders $80_1$ and $80_2$. Specifically, the output signals $s_1(n)$ and $S_2(n)$ from encoder $80_1$ are connected, respectively, to spreaders $110_{1.1}$ and $110_{1.2}$, and the output signals $S_3(n)$ and $S_4(n)$ from encoder $80_2$ are connected, respectively, to spreaders $110_{2.1}$ and $110_{2.2}$. By way of the same convention used earlier for the STTD CDMA transmitter $12_1$ of FIG. 2, in FIG. 11 transmitter $12_4$ is shown to transmit signals along its P transmit antennas that may be represented as the vector $u(n)$ described earlier in Equation 4.

As with the previous embodiments, transmitter $12_4$ is an example of a multiple space time encoding transmitter, where here the example is multiple OTD using CDMA spreading, and once more the preferred embodiments contemplate two different receiver techniques for such a transmitter. Recall these techniques are first a receiver employing a MIMO equalization approach followed by despreading and space time (e.g., OTD) decoding and second employing a joint interference cancellation approach. Each of these receivers is detailed below.

FIG. 12 illustrates an electrical and functional block diagram of a receiver $30_7$ for receiving multiple OTD CDMA signals from transmitter $12_4$ of FIG. 11, where receiver $30_7$ represents the example introduced above implementing a MIMO equalization followed by despreading and OTD decoding. Again, some of the blocks of receiver $30_7$ are comparable to earlier blocks and, thus, the reader is referred to the earlier discussion of those blocks for details. Indeed, a comparison of receiver $30_7$ and receiver $30_1$ of FIG. 3 reveals that the former differs in that it includes OTD decoders $120_1$ through $120_K$ as opposed to STTD decoders $44_1$ through $44_K$. Thus, the remaining blocks in FIG. 12 are not discussed since one skilled in the art should appreciate their functionality from the earlier embodiments, while the differences with respect to OTD decoding and in the present context of OTD CDMA transmissions is detailed below. Moreover, the following analysis also introduces the approach of FIG. 13, as also discussed below.

Since receiver $30_7$ is receiving CDMA communications, then its received signals may be represented in the same form as shown earlier in Equation 20, which is repeated here for the convenience of the reader:

$$r = \sum_{k=1}^{K} \sqrt{p_k}\, \Psi_k C_k s_k + \eta \qquad \text{Equation 20}$$

Moreover, because receiver $30_7$ is receiving communications encoded in an OTD format, then Equation 53 also applies, and it is also repeated here for the convenience of the reader:

$$s = \left(I_{\frac{N}{2}} \otimes F\right) x \qquad \text{Equation 53}$$

Equation 53 may be written in terms of the K codes or users, as shown in the following Equation 65:

$$s_k = \left(I_{\frac{N}{2}} \otimes F\right) x_k \qquad \text{Equation 65}$$

Accordingly, the value of $s_k$ from Equation 65 may be substituted into Equation 20, thereby yielding the following Equation 66:

$$r = \sum_{k=1}^{K} \sqrt{p_k}\, \Psi_k C_k \left(I_{\frac{N}{2}} \otimes F\right) x_k + \eta \qquad \text{Equation 66}$$

Recall earlier that in the downlink direction, the assumption of Equation 21 (i.e., that $\Psi_k = \Psi$) may be applied. Using that assumption in Equation 66, the following Equation 67 results:

$$r = \Psi \sum_{k=1}^{K} \sqrt{p_k}\, C_k \left(I_{\frac{N}{2}} \otimes F\right) x_k + \eta \qquad \text{Equation 67}$$

In Equation 67, $\Psi$ has a dimension of $N(SF)Q \times N(SF)P$, $C_k$ has a dimension of $N(SF)P \times NP$, the product $$\left(I_{\frac{N}{2}} \otimes F\right)$$

has a dimension of $NP \times NP/2$, and $x_k$ has a dimension of $NP/2$. Accordingly, from the realized factors in Equation 67, again different receiver approaches may be implemented in order to solve for an estimate of x, using either a MIMO equalization approach followed by despreading and OTD decoding or a joint interference cancellation approach. The first of these approaches is illustrated in FIG. 12 while the second is illustrated in FIG. 13.

Returning now to FIG. 12, it may be seen and appreciated from earlier embodiments that matched filter 38 receives the value r and operates to compensate for the factor $\Psi$ as shown in Equation 67 to thereby output an estimated value $\hat{r}$, and MIMO equalizer 40 receives $\hat{r}$ and operates on it to perform, by way of example, a linear MMSE to produce and output a value y. Next, despreaders $42_1$ through $42_K$ remove the effects of the CDMA code(s) from y. Finally, OTD decoders $120_1$ through $120_K$ compensate for the remaining factor of the product $$\left(I_{\frac{N}{2}} \otimes F\right)$$

from Equation 67. Accordingly, each of OTD decoders $120_1$ through $120_K$ outputs a corresponding estimate $\hat{d}_1$ through $\hat{d}_K$. [question: shouldn't the previous sentence, and FIG. 12 in the outputs of $120_1$ through $120_K$, show $\hat{s}_1$ through $\hat{s}_k$ rather than $\hat{d}_1$ through $\hat{d}_k$?] These estimates are connected to extract block 46, which operates as described earlier to produce $\hat{x}_1$ through $\hat{x}_K$. These outputs therefore represents estimates of the transmitted symbol data $x_1$ through $x_k$. Note, however, that in many instances a given receiver will have interest only in one of the K codes and, thus, for that case only a single value of $\hat{x}_K$ might be produced, or some subset of all the K codes may be at interest and the receiver may corresponding provide each value of $\hat{x}$ for the values of K at interest. Lastly, receiver $30_7$ generally has the same advantages as in the case of multiple STTD CDMA communications (with, of course, the difference of using TDMA here as opposed to CDMA) and again the number of receive antennas Q should equal or exceed the number of transmit antennas P.

Figure 13:
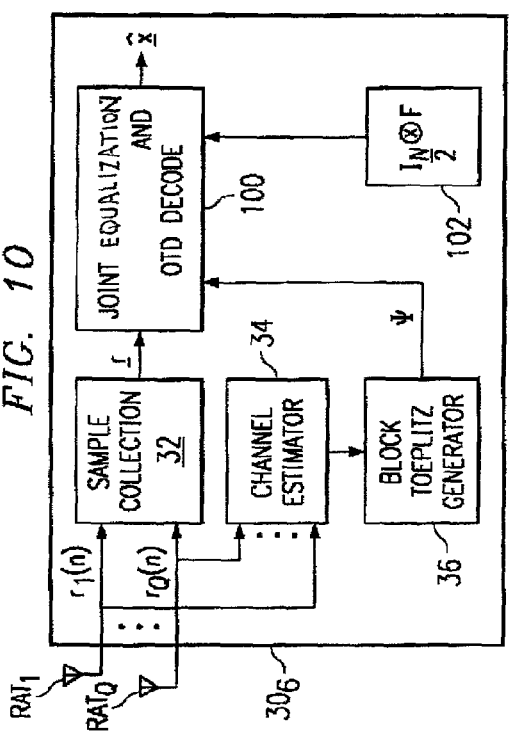
FIG. 13 illustrates an electrical and functional block diagram of a receiver for receiving multiple OTD CDMA and implementing a joint equalization and OTD decoding approach.

Turning now to FIG. 13, it illustrates an electrical and functional block diagram of a receiver $30_8$ for receiving multiple OTD CDMA signals from transmitter $12_4$ of FIG. 11, where receiver $30_8$ represents the example of a joint equalization, despreading, and OTD decoding approach. Again, some of the blocks of receiver $30_8$ are comparable to earlier blocks and, thus, the reader is referred to the earlier discussion of those blocks for details. Thus, the remaining discussion proceeds with the assumption that the reader is familiar with the generation of r and $\Psi$. Moreover, because OTD communications are involved, again transmitter $12_4$ of FIG. 11 does not transmit conjugates of the data symbols and, hence, preferably receiver $30_8$ does not operate with respect to any conjugates of the values in r.

In FIG. 13, both r and $\Psi$ are connected to a joint interference cancellation and OTD decode block 130. The interference cancellation aspect of block 130 serves to suppress the interference effects caused by multipaths in receiver $30_8$. In this regard, and for reasons now explored, block 130 also receives the values $C_k$ and $\sqrt{p_k}$ from factor block 132 and the value $$\left(I_{\frac{N}{2}} \otimes F\right)$$

from factor block 134. The reasons for providing these factors (as shown in Equation 66) as well as the operation with respect to those factors is now explored.

Let the value $\Lambda_k$ be defined according to the following Equation 68 and with respect to taking the product shown therein from Equation 66:

$$\Lambda_k = \Psi_k C_k \left(I_{\frac{N}{2}} \otimes F\right) \quad \text{Equation 68}$$

Using the definition from Equation 68, Equation 66 may be re-stated in simpler form as shown in the following Equation 69:

$$r = \sum_{k=1}^{K} \sqrt{p_k} \Lambda_k x_k + \eta \quad \text{Equation 69}$$

Moreover, Equation 69 may be written out for all values of K, as shown in the following Equation 70:

$$r = \left[\sqrt{p_1} \Lambda_1 \sqrt{p_2} \Lambda_2 \ldots \sqrt{p_K} \Lambda_K\right] \begin{bmatrix} x_1 \\ x_2 \\ \vdots \\ x_K \end{bmatrix} + \eta \quad \text{Equation 70}$$

Next, let the two multiplicands of Equation 70 be represented by the following designations in Equations 71 and 72:

$$\Lambda = \left[\sqrt{p_1}\Lambda_1 \sqrt{p_2}\Lambda_2 \ldots \sqrt{p_K}\Lambda_K\right] \quad \text{Equation 71}$$

where, $\Lambda$ has the dimensions N(SF)Q×NPK/2.

$$x = \begin{bmatrix} x_1 \\ x_2 \\ \vdots \\ x_K \end{bmatrix} \quad \text{Equation 72}$$

Finally, therefore, from Equations 71 and 72, Equation 70 may be stated in the simple form of the following Equation 73:

$$r = \Lambda x + \eta \quad \text{Equation 73}$$

From the form of Equation 73, block 130 may solve for an estimate of x again using the various approaches mentioned with respect to earlier embodiments, including zero forcing or MMSE, 1-shot (i.e., linear) or iterative, 1-stage or multistage, maximum likelihood detection, or a combination thereof. By way of example, assume that block 130 performs a linear MMSE. Accordingly, from Equation 73 an estimate of x may be realized according to the following Equation 74:

$$\hat{x} = (\Lambda^H \Lambda + \sigma^2 I)^{-1} \Lambda^H r \quad \text{Equation 74}$$

Given Equation 74 and returning to FIG. 13, one skilled in the art will appreciate the reason for providing the values in factor blocks 132 and 134 to block 130. Particularly, those factors determine the value of $\Lambda$ and, thus, they are required (in addition to the input r) in order for block 130 to solve Equation 71. Accordingly, the output of block 130 is the estimated value $\hat{x}$.

Finally, various observations may be made with respect to the example receiver $30_8$ of FIG. 13, and they are similar to those with respect to certain previous embodiments. For example, the advantages and considerations associated with receiver $30_8$ are comparable to the case of a joint approach for receiving multiple STTD CDMA communications, that is, performance is likely increased but additional information is needed by receiver $30_8$ so as to achieve these results (e.g., requiring knowledge of $\{C_k\}_{k=1}^{K}$ and $\{P_k\}_{k=1}^{k}$). Also, for the implementation of receiver $30_8$, note that the number or receive antennas Q should meet the requirement of the following Equation 75:

$$Q \geq \frac{PK}{2(SF)} \quad \text{Equation 75}$$

The preceding demonstrates various preferred embodiments that provide wireless multiple space time encoded transmissions of symbols from a transmitter to a receiver, where the receiver receives multipaths in response to the transmissions and operates to produce estimates of the transmitted symbols from these multipaths. Multipath processing is achieved in combination with alternative receiver approaches, including MIMO equalization followed by decoding (and despreading, where CDMA is used) or alternatively through joint equalization and decoding (with possible despreading). While space time encoding has been shown by ways of example as STTD or OTD, one skilled in the art may apply the present inventive teachings to other space time encoding formats. For example, there are a number of other linear space-time block coding schemes. The most general class is called the linear dispersion code ("LDC"), which includes STTD and OTD as special cases. Indeed, the multiple uses of STTD and OTD as described herein also may be considered special cases of LDC. Other examples of space-time block coding schemes include phase-shift transmit diversity ("PSTD"), "time-switched transmit diversity ("TSTD"), and so-called space time spreading ("STS") technology offered by Lucent Technologies. Accordingly, the preferred embodiments also may be applied to these alternatives, while the illustrated examples of STTD and OTD may provide certain advantages as may be ascertained by one skilled in the art. For example, STTD is often favorable as it may be required in an implementation or dictated by standard, and further its inclusion of a complex conjugate operation may provide improved performance. However, and in the opposite manner, the use of OTD may prove beneficial where it is desired not to use a complex conjugate. In any event, from all of these examples, one skilled in the art should be able to apply the inventive teachings to design a receiver for any system with multiple linear orthogonal space time block codes, thereby further including multiple PSTD, multiple STS, and multiple TSTD.

Given the many variations described, the preferred embodiments are able to achieve certain levels of performance with varying requirements for signal processing. Moreover, while the preferred embodiments have been functionally described, one skilled in the art may readily ascertain various physical manners of implementing these devices such as through numerous combinations of software and hardware, including the use of digital signal processors, application specific integrated circuits, and so forth. Still further, while the preceding examples have generally shown the instance of P=4 transmit antennas, the inventive scope may be applied to a greater number of transmit antennas, and with a corresponding increase in the number of Q receive antennas according to the requirements set forth in this document. Finally, while numerous examples have thus been provided, one skilled in the art should recognize that various modifications, substitutions, or alterations may be made to the described embodiments while still falling with the inventive scope as defined by the following claims.

The invention claimed is:

1. A wireless receiver for receiving multiple space time encoded signals, the receiver comprising:
    a plurality of receive antennas;
    collection circuitry, coupled to the plurality of receive antennas, for collecting a plurality of signal samples, wherein the samples comprise samples of multipaths of the space time encoded signals;
    circuitry, coupled to the plurality of receive antennas, for determining a linear time invariant multiple-input multiple-output matrix in response to pilot values in the received multiple space time encoded signals;
    circuitry, coupled to the collection circuitry, for suppressing interference effects caused by the samples of multipaths and producing a yield signal in response to the plurality of signal samples and the linear time invariant multiple-input multiple-output matrix; and
    circuitry for estimating at least selected ones of the symbols in response to the yield signal.

2. The receiver of claim 1 wherein the plurality of signal samples are collected for a plurality of successive time instances and from each of the plurality of receive antennas.

3. The receiver of claim 1:
    wherein the multiple space time encoded signals comprise a set of symbols spanning a plurality of symbol times; and
    wherein the collection circuitry is for collecting a plurality of signal samples for a plurality of successive time instances exceeding the plurality of symbol times.

4. The receiver of claim 1 wherein the multiple space time encoded signals comprise multiple space-time transmit diversity signals.

5. The receiver of claim 4 wherein the multiple space-time transmit diversity signals are transmitted by the single transmitter using a code division multiple access format.

6. The receiver of claim 5 wherein the circuitry for suppressing interference effects caused by the samples of multipaths comprises interference cancellation circuitry.

7. The receiver of claim 6 and further comprising joint interference cancellation and space time decode circuitry, wherein the joint interference cancellation and space time decode circuitry comprises the interference cancellation circuitry.

8. The receiver of claim 7:
    and further comprising circuitry for determining a complex conjugate of the plurality of signal samples; and
    wherein the joint interference cancellation and space time decode circuitry is responsive to the plurality of signal samples and the complex conjugate of the plurality of signal samples.

9. The receiver of claim 8:
    and further comprising circuitry for determining a complex conjugate of the linear time invariant multiple-input multiple-output matrix; and
    wherein the joint interference cancellation and space time decode circuitry is further responsive to the complex conjugate of the linear time invariant multiple-input multiple-output matrix.

10. The receiver of claim 1, wherein, the multiple space time encoded signals are selected from the group consisting of multiple space-time transmit diversity signals, multiple orthogonal transmit diversity signals, multiple phase-shift transmit diversity signals, multiple time-switched transmit diversity signals, and multiple STS signals.

11. A wireless receiver for receiving multiple space time encoded signals, the receiver comprising:
    a plurality of receive antennas;
    collection circuitry, coupled to the plurality of receive antennas, for collecting a plurality of signal samples for a plurality of successive time instances and from each of the plurality of receive antennas, wherein the samples comprise samples of multipaths of the space time encoded signals;
    circuitry, coupled to the plurality of receive antennas, for determining a linear time invariant multiple-input multiple-output matrix in response to pilot values in the received multiple space time encoded signals;
    circuitry, coupled to the collection circuitry, for suppressing interference effects caused by the samples of multipaths and producing a yield signal in response to the plurality of signal samples and the linear time invariant multiple-input multiple-output matrix; and circuitry for estimating at least selected ones of the symbols in response to the yield signal;

wherein the multiple space time encoded signals comprise a set of symbols spanning a plurality of symbol times;

wherein the collection circuitry is for collecting a plurality of signal samples for a plurality of successive time instances exceeding the plurality of symbol times;

wherein the multiple space time encoded signals are selected from a group consisting of multiple space-time transmit diversity signals, multiple orthogonal transmit diversity signals, multiple phase-shift transmit diversity signals, multiple time-switched transmit diversity signals, and multiple space time spreading signals.

12. The receiver of claim 11 wherein the multiple space time encoded signals are transmitted by the single transmitter using a format selected from a group consisting of a code division multiple access format and a time division multiple access format.

13. A method of operating a wireless receiver comprising:

receiving, along a plurality of receive antennas, multiple space time encoded signals from a plurality of transmit antenna sets, wherein the multiple space time encoded signals comprise a set of symbols and wherein each transmit antenna set is coupled to a corresponding encoder at a single transmitter;

collecting, from the plurality of receive antennas, a plurality of signal samples, wherein the samples comprise samples of multipaths of the space time encoded signals;

determining a linear time invariant multiple-input multiple-output matrix in response to pilot values in the received multiple space time encoded signals;

suppressing interference effects caused by the samples of multipaths;

producing a yield signal in response to the samples of multipaths and the linear time invariant multiple-input multiple-output matrix; and estimating at least selected ones of the symbols in response to the yield signal.

14. The method of claim 13 wherein the plurality of signal samples are collected for a plurality of successive time instances and from each of the plurality of receive antennas.

15. The method of claim 13 wherein the multiple space time encoded signals comprise a set of symbols spanning a plurality of symbol times; and wherein the collecting step collects a plurality of signal samples for a plurality of successive time instances exceeding the plurality of symbol times.

16. The method of claim 13 wherein the multiple space time encoded signals comprise multiple space-time transmit diversity signals.

17. The method of claim 16 wherein the multiple space-time transmit diversity signals are transmitted by the single transmitter using a code division multiple access format.

* * * * *